US005706494A

United States Patent [19]
Cochrane et al.

[11] Patent Number: 5,706,494
[45] Date of Patent: Jan. 6, 1998

[54] SYSTEM AND METHOD FOR CONSTRAINT CHECKING BULK DATA IN A DATABASE

[75] Inventors: Roberta Jo Cochrane, Los Gatos; Mir Hamid Pirahesh, San Jose, both of Calif.; Richard Sefton Sidle, Toronto; Calisto Paul Zuzarte, Pickering, both of Canada

[73] Assignee: International Business Machines Corporation, Armonk, N.Y.

[21] Appl. No.: 387,037

[22] Filed: Feb. 10, 1995

[51] Int. Cl.$^6$ .................................................. G06F 17/30
[52] U.S. Cl. ................. 395/602; 395/604; 395/612; 395/616
[58] Field of Search ..................... 395/600, 602, 395/604, 612, 616; 364/DIG. 1, DIG. 2

[56] References Cited

U.S. PATENT DOCUMENTS

| | | | |
|---|---|---|---|
| 4,506,326 | 3/1985 | Shaw et al. | 395/700 |
| 4,933,848 | 6/1990 | Haderle et al. | 395/600 |
| 4,947,320 | 8/1990 | Crus et al. | 395/600 |
| 5,133,068 | 7/1992 | Crus et al. | 395/600 |
| 5,201,046 | 4/1993 | Goldberg et al. | 395/600 |
| 5,226,158 | 7/1993 | Horn et al. | 395/600 |
| 5,295,256 | 3/1994 | Bapat | 395/500 |
| 5,301,317 | 4/1994 | Lohman et al. | 395/600 |
| 5,355,474 | 10/1994 | Thuraisngham et al. | 395/600 |
| 5,367,675 | 11/1994 | Cheng et al. | 395/600 |
| 5,386,557 | 1/1995 | Boykin et al. | 395/600 |
| 5,421,008 | 5/1995 | Banning et al. | 395/600 |
| 5,471,629 | 11/1995 | Risch | 395/800 |
| 5,499,359 | 3/1996 | Vijaykumar | 395/600 |

FOREIGN PATENT DOCUMENTS

| | | | |
|---|---|---|---|
| 89307075.5 | 7/1989 | European Pat. Off. | G06F 15/40 |
| 90305456.7 | 5/1990 | European Pat. Off. | G06F 15/40 |

OTHER PUBLICATIONS

Ingo DB, Spring 1989, USA, vol. 4, No. 1, ISSN 0891-6004, pp. 13-19, XP000571335 Eberhard, R., et al: "DB2 Referential Integrity Performance" p. 13, col. 1, Line 1, p. 13, col. 1, Line 53.

Communication, European Search Report, Jun. 4, 1996.

Guy M. Lohman, "Grammar-Like Functional Rules for Representing Query Optimization Alternatives", IBM Almaden Research Center Report, San Jose, California, pp. 18-26, 1988.

Hamid Pirahesh et al., "Extensible/Rule Based Query Rewrite Optimization in Starburst", *Proceedings of ACM SIGMOD 1992 Intl. Conf. on Management of Data*, pp. 39-47.

*Primary Examiner*—Thomas G. Black
*Assistant Examiner*—Maria N. Von Buhr
*Attorney, Agent, or Firm*—Baker, Maxham, Jester & Meador

[57] ABSTRACT

In a relational database management system (RDMS), a method and system for constraint checking of bulk data after storage in a base table. This invention generates a "dummy" INSERT inquiry to cause the compiler constraint rule engine to generate code for checking for constraint violations. After construction of a Query Graph Model by the compiler, a logic module replaces the INSERT inquiry with a SELECT inquiry to create code that when executed will select records from the bulk data table. Constraint violations are handled in several ways by this invention, including merely reporting that a constraint error exists or listing those records that violate constraint conditions. The logic also enforces referential integrity constraints by applying the SQL CASCADE command to the violating records to expand the violation list to include children records that would be orphaned when their parent records are later removed.

35 Claims, 11 Drawing Sheets

SYSTEM AND METHOD FOR CONSTRAINT CHECKING BULK DATA IN A DATABASE

BACKGROUND OF THE INVENTION

1. Field of the Invention

This invention relates generally to Relational Database Processing Systems, and in particular, to constraint checking and violation capture for bulk data stored in a relational database.

2. Description of the Related Art

A relational database management system (RDMS) uses relational techniques for storing and retrieving data. Relational databases are computerized information storage and retrieval systems in which data in the form of tables ("relations") are typically stored for use on disk drives or similar mass data stores. A "relation" includes a set of rows ("tuples" or "records") spanning one or more columns. A "record" expresses a mathematical relation between its column elements. Reference is made to C. J. Date, *An Introduction to Database Systems*, vol. 1, 4th edition, Addison-Wesley Publishing Co. Reading, Mass. (1986) for a description of a relational database management system.

An RDMS receives and executes commands to store, retrieve and delete data using high-level query languages such as the Structured Query Language (SQL). The term "query" means a set of commands for acting on data in a stored database. An SQL standard has been maintained by the International Standards Organization (ISO) since 1986. Reference is also made to the SQL-92 standard "Database Language SQL" published by the American National Standards Institute (ANSI) as ANSI X3.135-1992 and published by the ISO as ISO/IEC 9075:1992 for the official specification of the 1992 version of the Structured Query Language. See also James R. Groff et al. (*LAN Times Guide to SQL*, Osborne McGraw-Hill, Berkeley, Calif. 1994) for a description of SQL-92.

A table in an RDMS is partitioned into rows and columns such that there is one value at each intersection of a row and column. All of the values in a column are of the same data type. The only exception to this rule is that a value could be NULL. A NULL is a marker used to fill a place in a column where data is missing for some reason.

Tables are created explicitly by using the SQL CREATE TABLE command. A table may be created as "permanent", "temporary", or "virtual". Permanent tables include the base tables that contain the fundamental data that is permanently stored in the database. Fundamental data refers to the data for which the database is created to manage in the first place, for example, records of a group such as employees or students. Virtual tables—also called "view"—are tables derived from base tables using queries. The view does not exist in the database as a stored set of values like a base table. Instead the rows and columns of data visible through the view are the query results produced by the query that defines the view. The definition of the view is stored in the database. Temporary tables are not permanently stored, but are used for handling intermediate results, similar to program variables. Temporary tables are automatically flushed at the end of a working session. A table may be created, yet not have any data in it. Such a table, referred to as "empty", is typically created for receiving data at a later time.

"Constraints" define conditions that data must meet to be entered into a permanent table of fundamental data. Constraints may apply to columns or to tables; they are checked by an RDMS. A constraint can be checked at any of the following times:

(1) after every statement that affects a table (e.g., after an INSERT query);

(2) at the end of a transaction executing one or more statements that affect a table; and (3) at any time between 1 and 2.

Frequently, in large commercial database systems, data must be entered quickly and in bulk. Bulk-loading facilities, available for this purpose, load database tables at high speed from files outside an RDMS.

Because bulk-loading delivers massive amounts of data in a short amount of time, constraint checking can impose a severe bottleneck if not deferred until all of the data are loaded.

Even if deferred, constraint checking that must check each record one time for one constraint violation, flag the violation, and then check the same record again for each remaining constraint will consume a large amount of time, compounding the cost of bulk loading. For example, if 10,000 records are entered and there are 10 constraints to check, each constraint check of each record consuming one-half second, it will take several hours to ensure the integrity of the bulk-loaded data. The check of the first constraint for each record of 10,000 records will consume 5,000 seconds, and the 5,000 second process will have to be repeated for each constraint to be checked. Further, if constraints are checked at the end of a transaction, rollback will add more time for those records which violate constraints. Clearly, there is a long-felt need in the art for a utility that can check all constraints simultaneously for each record in a given table.

Recently, bulk loading tools have been provided which do not perform constraint checking. A table receiving bulk-loaded data is placed in a "pending" state, meaning its data cannot be used until checked for constraints. What is needed is a tool for checking for constraints of such bulk-loaded data that can do so speedily and which also includes the capability of repairing such tables to remove violating records.

In any tool that performs constraint checking of bulk-loaded data the problem of ensuring that no constraints are violated is complicated by the need to ensure "referential integrity" at the database. Referential integrity ensures soundness of an entire database. Relatedly, consider the example of an employee database with a table that groups employees by department and a table that contains all possible departments of an employing organization. In this case, the table of employees would include a column representing the respective employees' department numbers. The employee department number value is a "foreign key" that references an unique identifying column in the table containing all the departments in an employing organization. The second table, in this case, is the "parent table". The unique identifying column in the parent table identifying department titles is referred to as a "primary key". Referential integrity is the state when all foreign key values are present in their parent keys. If an employee's department is eliminated and its corresponding record is deleted from the parent table, then the foreign key in the employee record, representing that department, is invalid. In such a case, the system would lack referential integrity. Although the above simple example shows a foreign and primary key having only one column, referential integrity can be assured using multi-column keys.

In the above example, the record for the employee having no department is said to be "orphaned" because the foreign key has no parent table. A typical SQL technique for dealing with orphans is to eliminate them when their parent references are eliminated. A function known as CASCADE is available in SQL for ensuring that records having foreign keys are eliminated when their referenced primary keys are eliminated.

What is needed is a suitable tool and technique for constraint-checking bulk-loaded data in a pending table that includes a violation capture mechanism that also ensures referential integrity.

SUMMARY OF THE INVENTION

To overcome the limitations in the prior art described above, and to overcome other limitations that will become apparent, this invention discloses a method and tool for constraint-checking of bulk-loaded data after storage in a relational database, that also ensures referential integrity.

In the method of this invention, a data processor generates an INSERT query for inserting one or more records into a bulk-loaded table in an RDMS. The processor then calls an SQL compiler to compile an SQL INSERT command. The code generated to execute the INSERT includes code to check for constraint violations in the records to be inserted. However, before compiling, optimizing, and executing the compiled code, the method of this invention replaces an INSERT command with a SELECT command, thereby enabling the resulting code to "constraint-check" the bulk-loaded data by selecting records that are in violation of the column constraints. This invention further includes an environment in which the above-described method may be carried out.

DETAILED DESCRIPTION OF THE PREFERRED EMBODIMENTS

Figure 1:
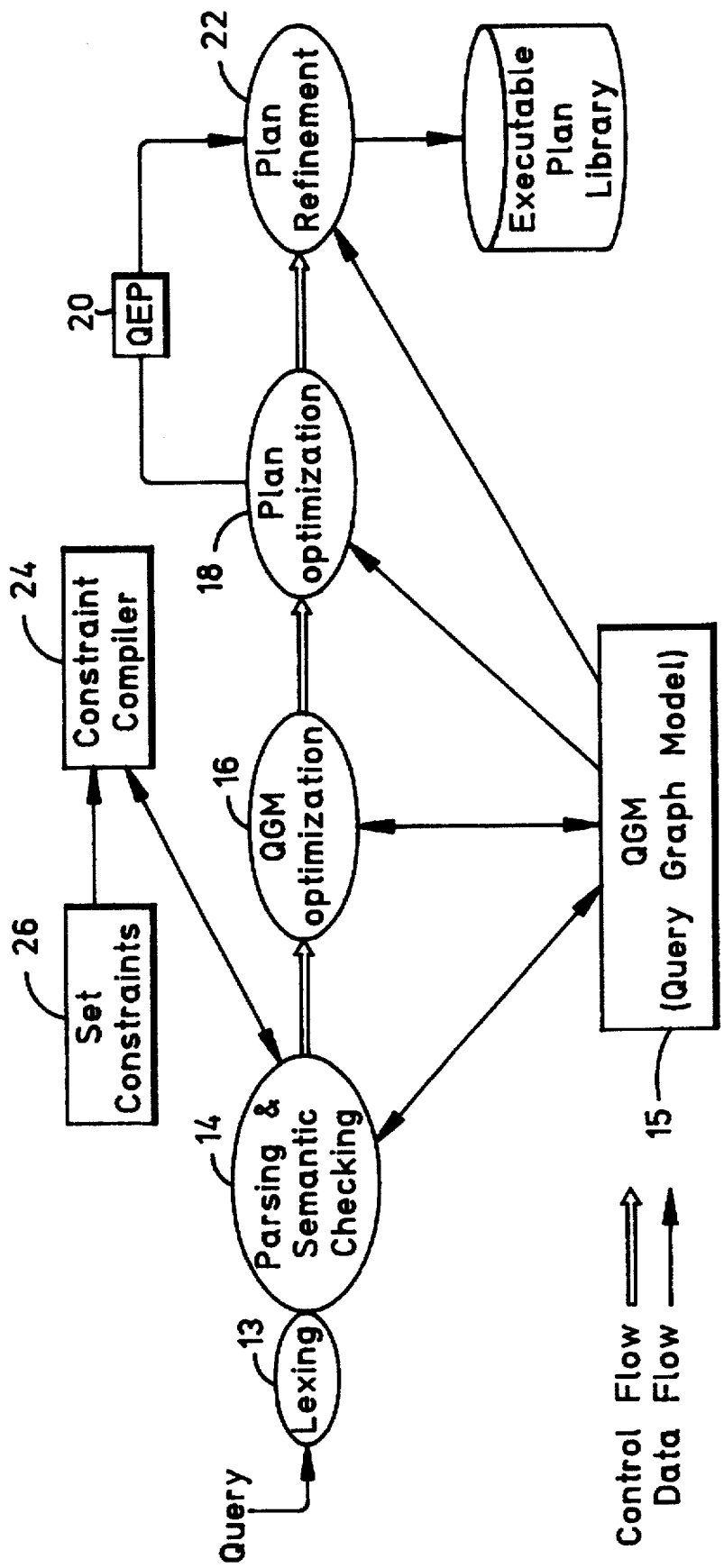
FIG. 1 shows a schematic representation of the query translation process using the method of this invention.

Referring now to the drawings in which like reference numbers represent corresponding parts throughout, in FIG. 1 a query translation process used in the known IBM Starburst relational database management system (Starburst RDMS) is shown with modifications necessitated for enabling the present invention. The IBM Starburst RDMS is described in detail in L. M. Hass, et at., "An Extensible Processor for an Extended Relational Query Language", IBM Research Report, RJ 6182, IBM Almaden Research Center, San Jose, Calif., April 1988.

Overview of Query Translation Process with SET CONSTRAINTS

Queries written in SQL, or the like, are processed in phases as shown in FIG. 1. An SQL query is first lexed at 13, parsed and checked semantically at 14, and converted into an internal representation denoted as the Query Graph Model (QGM) 15. The QGM is a well-known data structure that summarizes the semantic relationships of the query for use by all components of the query compiler. A QGM optimization procedure 16 then rewrites the QGM in canonical form by iteratively transforming the QGM into a semantically equivalent QGM 15. Reference for explanation regarding such optimization is made to W. Hasen, et al., "Query Rewrite Optimization in Starburst", IBM Research Report, RJ 6367, IBM Almaden Research Center, San Jose, Calif., August 1988.

The purpose of QGM optimization 16 is to simplify QGM 15 to help the subsequent plan optimization process to produce improved Query Execution Plans (QEPs). A plan optimization procedure 18 generates alternative QEPs, and chooses the best QEP 20, based on estimated costs. The plan refinement procedure 22 transforms the best QEP 20 further by adding information necessary at execution time to make QEP 20 suitable for efficient execution. QGM optimization step 16 is separate and distinct from QEP optimization step 18. For instance, reference is made to U.S. Pat. No. 5,345,585 issued to Iyer et al., entirely incorporated herein by this reference, for a discussion of a useful join optimization method suitable for use in QEP optimization step 18. Reference is also made to U.S. Pat. No. 5,301,317 issued to Lohman et al., entirely incorporated herein by the reference, for a description of an adaptive QEP optimization procedure suitable for step 18.

This invention is a constraint checking improvement that enables constraint checking of bulk-loaded data by using a QGM 15, the known constraint engine combined with a known SQL compiler, this combination being denoted as the constraint compiler 24, and a new module 26 described below. For an understanding of QGM 15 characteristics, reference is made to Hamid Pirahesh, et al., "Extensible/Rule Based Query Rewrite Optimization in Starburst," *Proceedings of ACM SIGMOD '92 International Conference on Management of Data*, San Diego, Calif., 1992. Among other characteristics, QGM 15 embraces the concepts of (a) quantifiers or record variables, (b) predicates, and (c) SELECT operations. This invention extends these concepts in a new and useful way to achieve its objectives.

One aspect of this invention is embodied as a particular program object module coupled with computer hardware, shown in FIG. 3 and discussed in detail below. This module is represented schematically in FIG. 1 at 26, and is denominated as the "SET CONSTRAINTS MODULE". Preferably, the method of this invention performed partly by this module is implemented in software, but it may also be embodied as hardware logic that implements the rules described below in connection with the flow charts in FIGS. 4–8. Further, this invention may be embodied as software code stored in any useful recording medium, including being recorded magnetically on the computer disk, shown in FIG. 12.

Because this invention extends RDMS features such as SQL query processing and QGM optimization to enable constraint checking of bulk-loaded data stored in a table residing in the database, it is necessary to discuss the QGM. Additionally, the constraint checking system of this invention also captures violations including those offending referential constraints, so that it is necessary to discuss referential integrity.

The QGM

Figure 2:
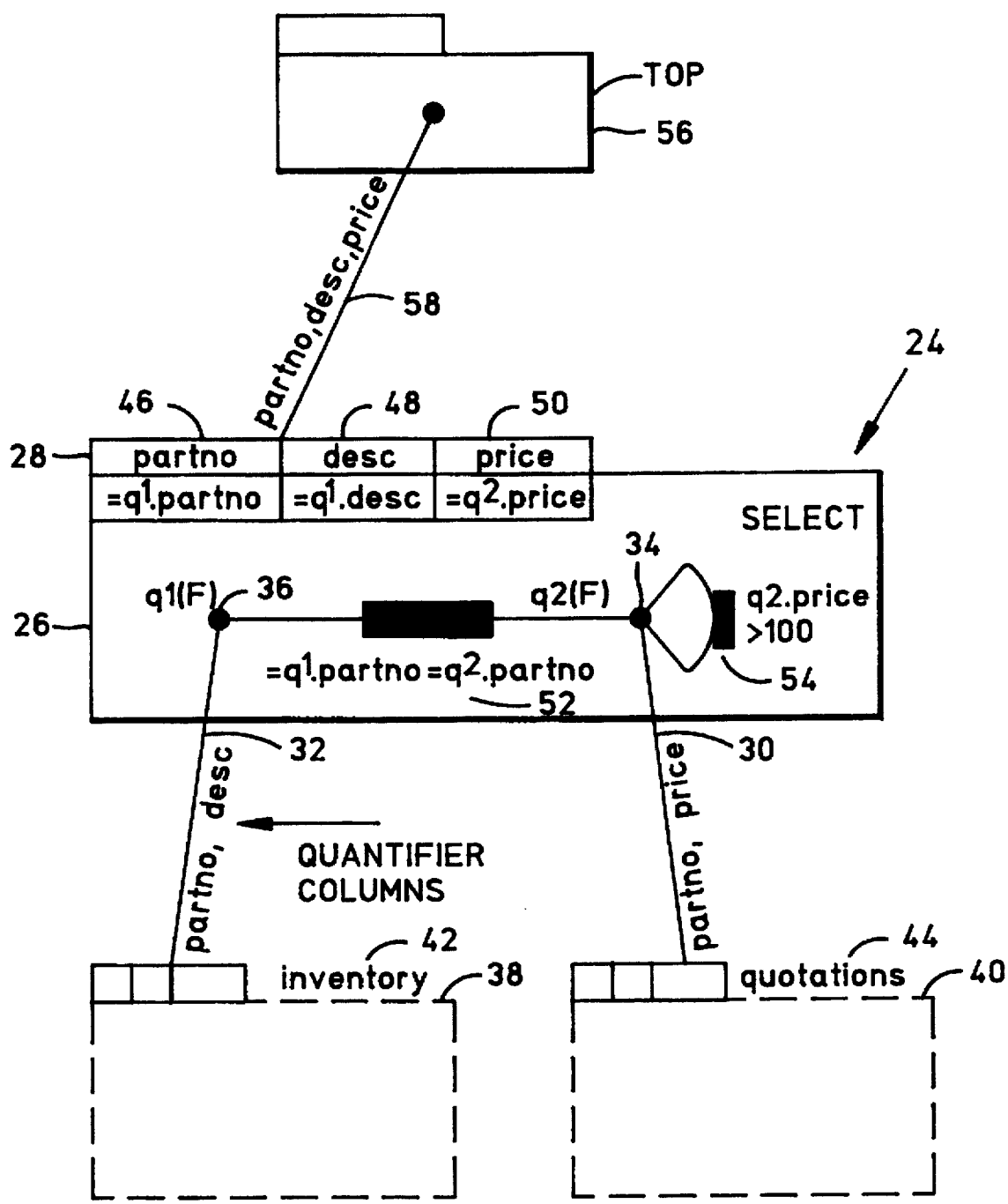
FIG. 2 shows a Query Graph Model (QGM) diagram from the prior art for an exemplary SQL query.

A useful QGM known in the art is now described. FIG. 2 provides a QGM representation of the following SQL query:

SELECT DISTINCT Q1.PARTNO, Q1.DESCP, Q2.PRICE
FROM INVENTORY Q1, QUOTATIONS Q2
WHERE Q1.PARTNO=Q2.PARTNO
AND Q2.PRICE>100

A SELECT box 24 is shown with a body 26 and a head 28. Body 26 includes dataflow arcs 30 and 32, which are also shown as the internal vertices 34 and 36. Vertex 36 is a set-former that ranges on (reads from) the box 38, which provides records on arc 32. Similarly, vertex 34 ranges on box 40, which flows records on dataflow arc 30. The attributes to be retrieved from the query, PARTNO 46, DESC 48 and PRICE 50, are in head 28. Boxes 38 and 40 represent the base-relations accessed by the query, INVENTORY 42 and QUOTATIONS 44, respectively. Box 24 embraces the operations to be performed on the query to identify the PARTNOs that match in the two base-relations, as required by the join predicate 52 represented as an internal predicate edge joining vertices 34 and 36. Vertex 34 also includes a self-referencing predicate 54 to identify prices of those PARTNOs that exceed 100.

For the purposes of this invention, note that each box or node (formally denominated "quantifier node") in FIG. 2 is coupled to one or more other nodes by dataflow arcs (formally denominated "quantifier columns"). For instance, base-relation node 38 is coupled to select node 24 by data-flow arc 32 and base-relation node 40 is connected to select node 24 by data flow arc 30. The activities inside select node 24 produce a new stream of data records that are coupled to the TOP node 56 along a dataflow arc 58. TOP node 56 represents the data output table requested by the query.

The object of several known QGM optimization procedures is to merge one or more nodes where possible by eliminating (collapsing) dataflow arcs. For instance, the above-cited Pirahesh et al. reference describes a set of rules for merging any number of nodes into a single SELECT node, with certain restrictions on non-existential or non-Boolean factor subqueries, set operators, aggregates and user-defined extension operators such as OUTER JOIN. Thus those skilled in the art know that QGM optimization step 16 usually rewrites the QGM to eliminate numerous nodes and data-flow arcs even before considering useful query execution plans in plan optimization step 18 (FIG. 1).

Ensuring Referential Integrity (RI)

One or more columns in a base-relation may be assigned a "key attribute", such as "primary key" or "foreign key". The primary key of a base-relation uniquely identifies each record (row) in the relation. A foreign key establishes a "referential" relationship between the base-table (child) and another (parent) table designated by the foreign key column attribute. An unique key is a set of columns whose values uniquely determine a record in the table, so a primary key is, by definition, an unique key. Thus, a parent/child relationship may be established between two relations by adding a foreign-key attribute to one and relating it to an unique key attribute in another, as is well-known in the art. Such relationships may be added without limit and each key attribute may span several columns.

Generally speaking, a referential constraint relates a possibly multi-column foreign key from the child table to an unique key in the parent table. There is only one primary key in a table, but there may be many unique keys.

Disadvantageously, there are four types of database updates that can corrupt the referential integrity of the parent/child relationships in a database. These include (a) inserting a new child record, (b) updating the foreign key in a child record, (c) deleting a parent record, and (d) updating the primary key in a parent record.

When a new row is inserted into the child table, its foreign key value must match one of the primary key values in the parent table, according to the column attribute. If the foreign key value does not match any primary key, then an attempt to insert the row is rejected since it will corrupt the database to allow a child to exist without a parent. Inserting a row in a parent table never gives this problem because it simply becomes a parent without children. Updating the foreign key in a child record is a different form of this problem. If the foreign key is modified by an UPDATE statement, the new value must match some primary key value in the parent relation to avoid "orphaning" the updated record.

Upon deletion of a parent record that has one or more children, the child records are orphaned because their foreign key values no longer match any existing primary key value in the parent relation. Deleting a record from the child relation is no problem because the parent merely loses a child. Updating the primary key in a parent record is a different form of this problem. If the primary key of a parent record is modified, all existing children of that record become orphans because their foreign key values no longer match an existing primary key value.

For each parent/child relationship created by a foreign key, SQL provides for an associated delete rule and an associated update rule. The delete rule specifies DBMS action when a user tries to delete a parent record. Available rules include RESTRICT, CASCADE, SET NULL, and SET DEFAULT. The update rule also specifies one of these DBMS actions when the user tries to update the value of one of the primary key columns in the parent relation. The usual RESTRICT rule merely rejects the attempted operation. The CASCADE rule automatically deletes and updates records from the children responsive to a command to delete or update a parent record.

System Overview

Figure 3:
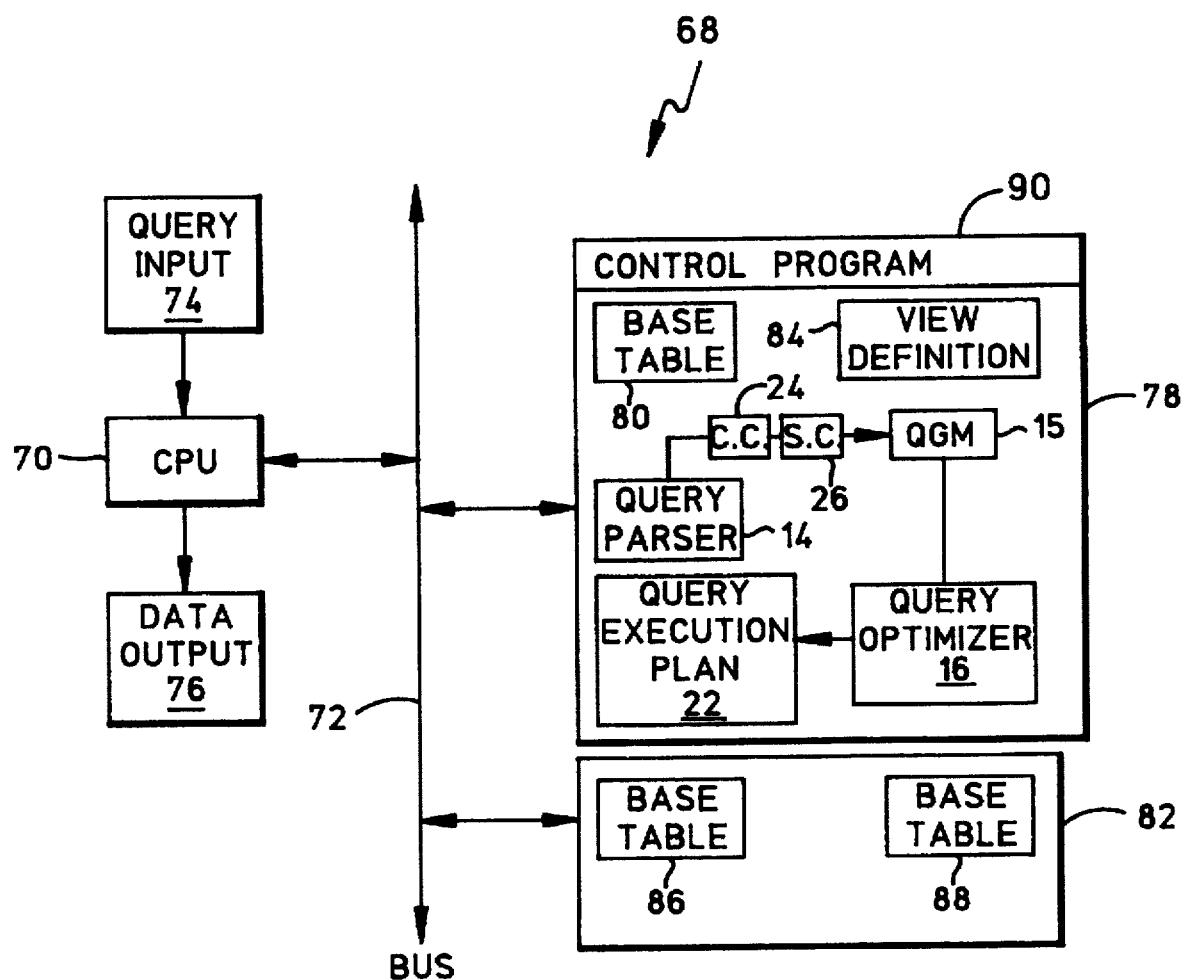
FIG. 3 is a functional block diagram of a relational database system suitable for application of the bulk data constraint checking system of this invention.

FIG. 3 shows a functional block diagram of a computer-implemented database processing system 68 suitable for practicing the procedure of this invention. This exemplary configuration is described for illustrative purposes only and it should be appreciated that the process and system of this invention can be embodied within system 68 in many different useful fashions, including the arrangement depicted in FIG. 3. System 68 includes a central processing unit (CPU) 70, which is coupled to a parallel bus 72. The query input terminal 74 allows the user to enter queries into system 68, either from a remote terminal or through any other useful method known in the art. As used herein, a "user query" includes a combination of SQL commands intended to produce one or more output data tables according to specification included in the query. The data output terminal 76 displays the query results to the user and may be physically co-located with query input terminal 74.

System 68 includes the address space 78, which is shown schematically as containing program objects and data objects. The base table 80 is an example of a data object pulled into address space 78 from the external mass store 82 by way of bus 72. The view definition 84 is another data object representing a "virtual table" made up of elements from one or more base tables in accordance with a VIEW definition statement. External mass store 82 includes a generally large plurality of base tables (also denominated base relations), exemplified by base tables 86 and 88. These base tables are moved partially or entirely between memory space 78 and external mass store 82 in a manner well-known in the art for database management systems.

Address space 78 also includes the control program object 90, which manages the other components of system 68. These components include the query parser 14 for accepting the query input from terminal 74 and forwarding it to the Query Graph Model (QGM) optimizer 16. The Constraint Compiler (C.C.) 24 and the Set Constraints (S.C.) Module 26 interact between the parser and the QGM in accordance with the method of this invention.

The QGM optimizer rewrites the QGM representation of the user query to provide a "canonical form" of the QGM for output to the query optimizer 16. For instance, a QGM canonical form may include a large cyclical join graph organized within a single select node having dataflow arcs from many base-tables, subject to the restrictions of primary and referential integrity. After identifying an "optimal" query execution plan, optimizer 16 produces this plan as a program object, depicted as query execution plan 22 in address space 78. Plan 22 is finally executed with the assistance of control program 90 and the resulting relation is forwarded to data output of display 76 upon completion. It can be appreciated by those skilled in the art that the description of system 68 in FIG. 3 is exemplary and that the system and process of this invention, represented as the SET CONSTRAINTS processing module 26, may be incorporated in any RDMS that uses a query optimization process.

Operation of the Invention

General Syntax

This invention employs known SQL statements in novel ways to solve the problems of the prior art. Therefore, a brief discussion of important SQL statements are included below.

In SQL, a SELECT statement is used to retrieve data and generally comprises the format: "SELECT<clause>FROM<clause>WHERE<clause>GROUP BY<clause>HAVING<clause>ORDER BY<clause>." The clauses generally must follow this sequence, but only the SELECT statement and FROM clauses are required. The result of executing a SELECT statement is a subset of data retrieved by the RDMS software from one or more existing tables or views stored in the relational database, with the FROM clause telling the RDMS software the name of the table or view from which the data is being selected. The subset of data is treated as a new table, termed the "result table", which typically comprises a temporary table. In general, the items specified in the SELECT clause of the SELECT statement determine the columns that will be returned in the result table from the table(s) identified in the FROM clause.

The WHERE clause determines which rows should be returned in the result table. Generally, the WHERE clause contains a "search condition" that must be satisfied by each row returned in the result table. The rows that satisfy the search condition form an intermediate set, which is then processed further according to specifications in the SELECT clause. The search condition may include one or more predicates, each of which specify a comparison between two or more column values, constants or correlated values. Multiple predicates in the WHERE clause are themselves connected by Boolean operators.

A JOIN operation combines tables or views by appending rows from one table or view to another table or view. The rows, or portions of rows, from the different tables or views are concatenated horizontally through common columns. The JOIN operation is not provided explicitly as an SQL statement; instead it may be implied by naming more than one table or view in the FROM clause of the SELECT statement. Although not required, JOIN operations normally include a WHERE clause that identifies the columns through which the rows can be combined. The WHERE clause may also include one or more predicates in a subquery with conditional operators that are used to select the rows to be joined.

An INSERT statement adds data to a database according to the format: "INSERT INTO table.name VALUES (constant [, ... ] | NULL)." INSERT fills one entire row in a single execution using the constants provided in the VALUES clause. Constraints are set for each table column when it is created, and a failure to comply with the table or column constraints will cause the INSERT to fail with an error. The SQL compiler has means for generating an internal process that compiles in the code to check constraints against the data modified by the SQL command.

The DELETE statement may be used to remove data according to the format: "DELETE FROM table.name [WHERE<condition clause>]." DELETE erases all records of the table which satisfy the WHERE clause's predicates.

A predicate is an expression that is used in certain statements to test values and determine whether the effects of the statement should be applied to their values. A predicate may have a Boolean value of TRUE, FALSE, or UNKNOWN. The UNKNOWN value results when NULLS are used in comparisons. In terms of constraint checking, NOT NULL means that a column being checked may not contain the NULL value.

Understanding of the process described below will be improved by referring to the symbols table included below. The symbol tables include brief definitions of the symbols used in a preferred embodiment of pseudocode useful for implementing this invention.

Description of Symbols

The pseudocode is designed with the mathematical assumption that it is given a set of tables $S=\{T_i, 1<=i<=n \}$ where $T_i$:

has $m_{T_i}$ columns, $$c_1, c_2 \ldots c_{m_{T_i}};$$

participates as the child in $x_{T_i}$ referential constraints, $$R_{(T_i,1)}, \ldots, R_{(T_i,x_{T_i})};$$

and participates in $y_{T_i}$ check constraints, $$C_{(T_i,1)}, \ldots, C_{(T_i,y_{T_i})}.$$

The following Tables S-1 through S-3 define the symbols used in the pseudocode embodiments shown in Tables 1–5.

TABLE S-1

| Symbol | Definition |
|---|---|
| $R_{(T_i,j)}$ | Referential Constraint |
| $^zR_{(T_i,j)}$ | Number of Columns of Referential Constraint |
| $T_i$ | Table |
| $T_i.R_{(T_i,j)}[k]$ | Column in $T_i$ corresponding to $k^{th}$ Column of Referential Constraint $R(T_{i,j})$ (foreign key) |
| $P_{(T_i,j)}$ | Parent Table in Referential Constraint |
| $P_{(T_i,j)}.R_{(T_i,j)}[k]$ | Column in Parent Table corresponding to $k^{th}$ column of unique key (i.e., corresponding to Referential Constraint $R_{(T_i,j)}$) |

TABLE S-2

| Symbol | Definition |
|---|---|
| $C_{(T_i,j)}$ | Check Constraint |
| $^zC_{(T_i,j)}$ | Number of Columns from $T_i$ used in Constraint $C_{(T_i,j)}$ |
| $C_{(T_i,j)}T_i.C(T_{i,j})$ | Evaluation of Constraint $C_{(T_i,j)}$ on a given record |
| $[^zC_{(T_i,j)}]$ | |

TABLE S-3

| Symbol | Definition |
|---|---|
| $E_i$ | Exception Table for $T_i$ where $1<=i<=n$ |
| $C_1, C_2, \ldots, C_{m_{T_i}}$ | Columns of $E_i$ matching those of Table $T_i$ |
| $C_{m_{T_i}+1}$ | Timestamp Field for $E_i$ |
| $C_{m_{T_i}+2}$ | Message Field for $E_i$ |

Formalisms

A raise error function raises a given error and rolls back the statement whenever it is invoked.

In addition to deleting (or inserting) the selected rows from (or into) the first table listed in the FROM (or INTO) clause, a DELETE (or INSERT) operator can also flow data into other operators just like a select. For example:

select $c_1$, 2 from (delete $c_1$, 5 FROM T where $c_1>5$);

selects a record with two columns for each record deleted from T. The first column is the value of the $c_1$ column of the deleted record and the second column is always 5.

This is used in generated queries to insert the values of the deleted records along with some computed information about which constraints are violated into exception tables. For example, the following query deletes all records from T and inserts columns $c_1$, $c_2$, and $c_3$ of each deleted record into table E.

insert into E (delete $c_1$, $c_2$, $c_3$ FROM T)

The existence of a COMPOUND SQL allows a grouping of a set of SQL statements together, and allows them to share common subexpressions. For example:

begin
   insert into $T_1$ select * from $T_1$;
   create temporary table DT as (delete from $T_2$)
   insert into $E_2$ select * from DT;
end This query first replicates the contents of T1, then deletes all records from T2 and inserts the deleted records into table E2.

Implementation of the Method

Figure 4:
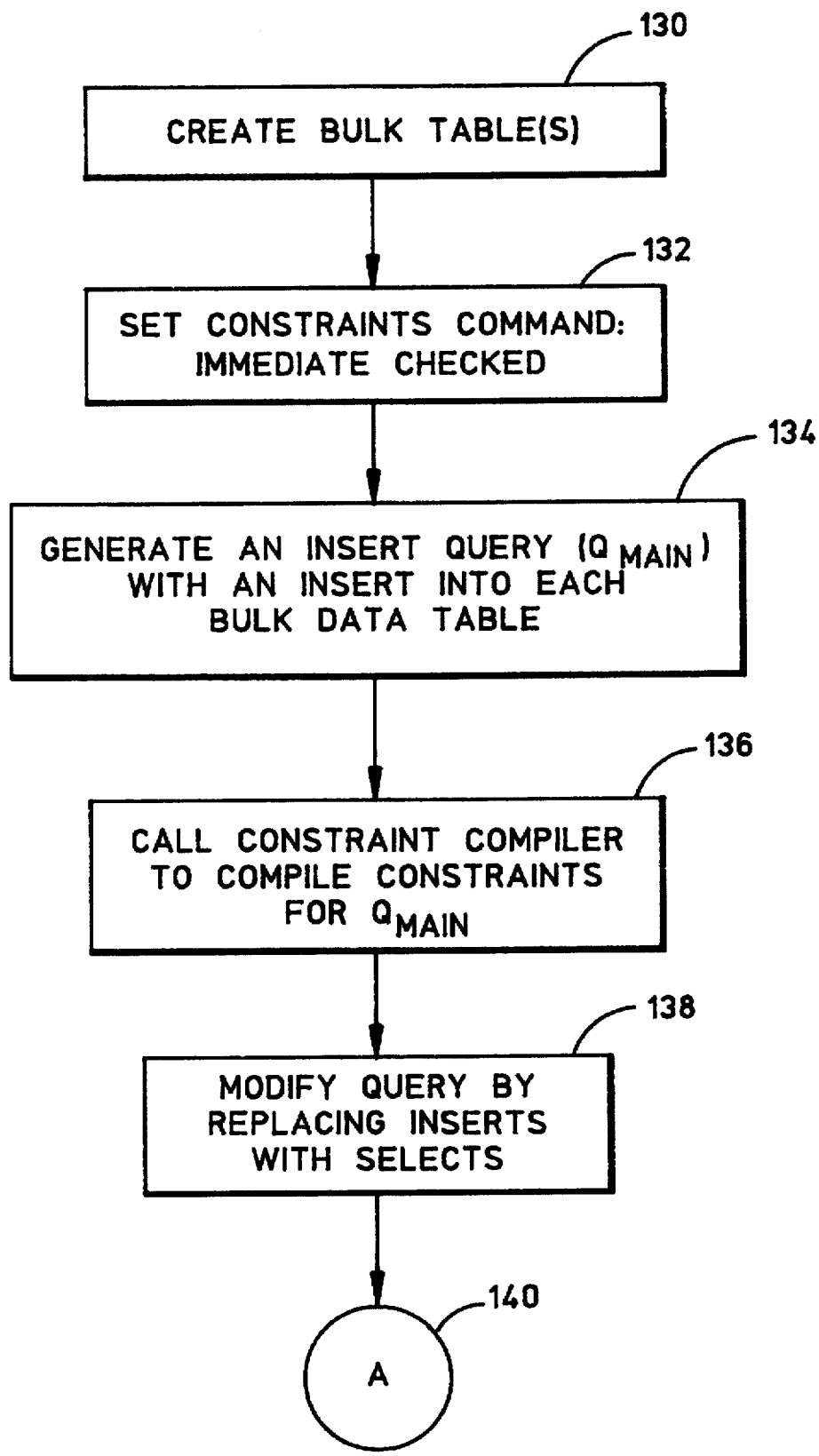
FIGS. 4–8 each provide a flow chart illustrating the steps employed in executing the method of the present invention.

Referring to FIG. 4, the process is implicitly started by the bulk loading of one or more tables $\{T_i\}$ in mass store 82, as shown in step 130. Such a table $T_i$ will be placed in a pending state until constraints are checked. Table $T_i$ can be represented by either table 86 or 88 (FIG. 3). The SELECT CONSTRAINTS process is initiated by an invocation command, for example, "SELECT COMMAND ON", as shown in step 132. The invocation command may be performed as an SQL query or may be automatically passed to processor 70. The invocation command causes the SELECT CONSTRAINTS module to generate an INSERT query denoted as $Q_{MAIN}$ that is really a "dummy" insert of records that purportedly are to be inserted in the table $T_i$ as shown in step 134.

A pseudocode representation of a general case preferred embodiment of such a dummy INSERT query is shown below in Table 1. Regarding the pseudocode represented in Tables 1–5, it will be apparent to one skilled in the art that the combination of the pseudocode shown in Tables 1–5 with the flow charts of FIGS. 4–9 enables the practicing of the method of this invention. To further explain the invention, a specific example employing the general case pseudocode of Tables 1–5 is discussed below in Tables 6–11.

TABLE 1

| | |
|---|---|
| 1. | begin |
| 2. | insert into $T_1$ select * from $T_1$; |
| 3. | insert into $T_2$ select * from $T_2$; |
| 4. | ... |
| 5. | insert into $T_n$ select * from $T_n$; |
| 6. | end |

Referring again to FIG. 4, when the dummy INSERT inquiry is generated, then the processor calls the constraint compiler 24 (FIG. 3) to compile the INSERT commands and check for constraint violations according to the constraint role engine, as shown in step 136. The compiler 24 compiles $Q_{MAIN}$ and produces a query that has been modified to provide the code for checking constraints. An example of the modification of the query, $Q_{MAIN}$, from Table 1 is provided below in Table 2:

TABLE 2

| | |
|---|---|
| 1. | begin |
| 2. | with $I_1$ as insert into $T_1$ select * from $T_1$ |
| 3. | select 1 |
| 4. | from $I_1$ |
| 5. | where 1=case |
| 6. | when $I_1.R_{(T_1,1)}[1]$ is not null and |
| 7. | ... |
| 8. | $I_1.R_{(T_1,1)}[^zR_{(T_1,1)}]$is not null and |
| 9. | not exists |
| 10. | (select 1 from $P_{(T_1,1)}$ |
| 11. | where $P_{(T_1,1)}.R_{(T_1,1)}[1]=I_1.R_{(T_1,1)}[1]$ |
| 12. | and $P_{(T_1,1)}.R_{(T_1,1)}[2]=I_1.R_{(T_1,1)}[2]$ |
| 13. | ... |
| 14. | and $P_{(T_1,1)}.R_{(T_1,1)}[^zR_{(T_1,1)}]=$ $I_1.R_{(T_1,1)}[^zR_{(T_1,1)}])$ |
| 15. | then raise_error('-3603', $R_{(T_1,1)}$.name) |
| 16. | ... |
| 17. | when $^i1^R(T_1,x_{T_1})[1]$ is not null and |
| 18. | ... |
| 19. | $^i1^R(T_1,x_{T_1})[^{i*}R(T_1,x_{T_1})]$ is not null and |
| 20. | not exists |
| 21. | (select 1 from $^P(T_1,x_{T_1})$ |
| 22. | where $^P(T_1,x_{T_1})^R(T_1,x_{T_1})[1]=$ $^i1^R(T_1,x_{T_1})[1]$ |
| 23. | and $^P(T_1,x_{T_1})^R(T_1,x_{T_1})[2]=$ $^i1^R(T_1,x_{T_1})[2]$ |
| 24. | ... |
| 25. | and$^P(T_1,x_{T_1})^R(T_1,x_{T_1})[^{i*}R(T_1,x_{T_1})]=$ |

TABLE 2-continued

```
           ¹₁·R(T₁,xT₁)ᶦᴿ(T₁,xT₁)ᴵ)
26.        then raise_error('-3603', ᴿ(T₁,xT₁).name)
27.        when not C(T₁,1)(I₁.C(T₁,1)[1], ...,
           I₁.C(T₁,1)[ᶦC(T₁,1)])
28.        then raise_error('-3603', C(T₁,1).name)
29.        ...
30.        when not ·C(T₁,yT₁)¹¹·C(T₁,yT₁)[1], ...,
           ¹₁·C(T₁,yT₁)ᶦᴿ(T₁,yT₁)ᴵ)
31.        then raise_error('-3603', ·C(T₁,xT₁).name)
32.        else 2
33.        with Iₙ as insert into Tₙ select * from Tₙ
34.        select 1
35.        from Iₙ
36.        where 1=case
37.        when Iₙ.R(Tₙ,1)[1]is not null and
38.             ...
39.             Iₙ.R(Tₙ,1)[ᶦR(Tₙ,1)]is not null and
40.             not exists
41.                  (select 1 from P(Tₙ,1)
42.                  where P(Tₙ,1).R(Tₙ,1)[1]=
                          Iₙ.R(Tₙ,1)[1]
43.                  and P(Tₙ,1).R(Tₙ,1)[2]=
                          Iₙ.R(Tₙ,1)[2]
44.                  ...
45.                  and P(Tₙ,1).R(Tₙ,1)[ᶦR(Tₙ,1)]=
                          Iₙ.R(Tₙ,1)[ᶦR(Tₙ,1)])
46.        then raise_error('-3603', R(Tₙ,1).name)
47.        ...
48.        when ¹ₙ·R(Tₙ,xTₙ)[1] is not null and
49.             ...
50.             ¹ₙ·R(Tₙ,xTₙ)ᶦᴿ(Tₙ,xTₙ)ᴵ
                is not null and
51.             not exists
52.                  (select 1 from ᴾ(Tₙ,xTₙ)
53.                  where ᴾ(Tₙ,xTₙ)·ᴿ(Tₙ,xTₙ)[1]=
                          ¹ₙ·R(Tₙ,xTₙ)[1]
54.                  and ᴾ(Tₙ,xTₙ)·ᴿ(Tₙ,xTₙ)[2]=
                          ¹ₙ·R(Tₙ,xTₙ)[2]
55.                  ...
56.                  and ᴾ(Tₙ,xTₙ)·ᴿ(Tₙ,xTₙ)ᶦᴿ(Tₙ,xTₙ)=
                          ¹ₙ·R(Tₙ,xTₙ)ᶦᴿ(Tₙ,xTₙ)ᴵ)
57.        then raise_error('-3603', ᴿ(Tₙ,xTₙ).name)
58.        when not C(Tₙ,1)(Iₙ.C(Tₙ,1)[1], ...,
           Iₙ.C(Tₙ,1)[ᶦC(Tₙ,1)])
59.        then raise_error('-3603', C(Tₙ,1).name)
60.        ...
61.        when not ·C(Tₙ,yTₙ)¹ₙ·C(Tₙ,yTₙ)[1], ...,
           ¹ₙ·C(Tₙ,yTₙ)ᶦᴿ(Tₙ,yTₙ)ᴵ)
62.        then raise_error('-3603', ·C(Tₙ,yTₙ).name)
63.        else 2
64.        end
65. end
```

With reference to FIGS. 1, 4, and Table 2, the steps of SELECT CONSTRAINT processing are further explained. In the above Table 2, the "raise_error('-3603" ... ) syntax is an example of a certain error having code number "3603". It is understood that any error code could be reported, not just the exemplary "3603" error code. The WHERE and CASE statements are used to check for constraint violations, as described above. Upon completion of step 136 (FIG. 4), execution of the query shown in Table 2 results in the checking of each record to be inserted for constraint violations. However, the SELECT CONSTRAINT module takes advantage of this situation by interrupting the normal query processing, as described with reference to FIG. 1 above, by modifying the query of Table 2 to effectively replace the INSERT statements with SELECT statements, as shown in step 138. In this way a new query is produced that can be used for constraint checking of bulk-loaded data, such as that stored in one or more tables, $T_j$.

The process of step 138 of FIG. 4 is provided below in Table 3 in a preferred pseudocode embodiment of this invention, wherein any INSERT statement is replaced with a SELECT statement.

TABLE 3

```
1.  begin
2.     select 1
3.     from T₁
4.     where 1=CASE
5.     when T₁.R(T₁,1)[1] is not null and
6.          ...
7.          T₁.R(T₁,1)[ᶦR(T₁,1)]is not null and
8.          not exists
9.               (select 1 from P(T₁,1)
10.              where P(T₁,1).R(T₁,1)[1]=T₁.R(T₁,1)[1]
11.              and P(T₁,1).R(T₁,1)[2]=T₁.R(T₁,1)[2]
12.              ...
13.              and P(T₁,1).R(T₁,1)[ᶦR(T₁,1)]=
                     T₁.R(T₁,1)[ᶦR(T₁,1)])
14.    then raise_error('-3603', R(T₁,1).name)
15.    ...
16.    when ᵀ₁·R(T₁,xT₁)[1] is not null and
17.         ...
18.         ᵀ₁·R(T₁,xT₁)ᶦᴿ(T₁,xT₁)ᴵ is not null and
19.         not exists
20.              (select 1 from ᴾ(T₁,xT₁)
21.              where ᴾ(T₁,xT₁)·ᴿ(T₁,xT₁)[1]=
                       ᵀ₁·R(T₁,xT₁)[1]
22.              and ᴾ(T₁,xT₁)·ᴿ(T₁,xT₁)[2]=
                       ᵀ₁·R(T₁,xT₁)[2]
23.              ...
24.              and ᴾ(T₁,xT₁)·ᴿ(T₁,xT₁)ᶦᴿ(T₁,xT₁)=
                       ᵀ₁·R(T₁,xT₁)ᶦᴿ(T₁,xT₁)ᴵ)
25.    then raise_error('-3603', ᴿ(T₁,xT₁).name)
26.    when not C(T₁,1)(T₁.C(T₁,1)[1], ...,
       T₁.C(T₁,1)[ᶦC(T₁,1)])
27.    then raise_error('-3603', C(T₁,1).name)
28.    ...
29.    when not ·C(T₁,yT₁)ᵀ¹·C(T₁,yT₁)[1], ...,
       ᵀ₁·C(T₁,yT₁)ᶦC(T₁,yT₁)ᴵ)
30.    then raise_error('-3603', ·C(T₁,yT₁).name)
31.    else 2
32.    ...
33.    select 1
34.    from Tₙ
35.    where 1=case
36.    when Tₙ.R(Tₙ,1)[1]is not null and
37.         ...
38.         Tₙ.R(Tₙ,1)[ᶦR(Tₙ,1)]is not null and
39.         not exists
40.              (select 1 from P(Tₙ,1)
41.              where P(Tₙ,1).R(Tₙ,1)[1]=Tₙ.R(Tₙ,1)[1]
42.              and P(Tₙ,1).R(Tₙ,1)[2]=Tₙ.R(Tₙ,1)[2]
43.              ...
44.              and P(Tₙ,1).R(Tₙ,1)[ᶦR(Tₙ,1)]=
                     Tₙ.R(Tₙ,1)[ᶦR(Tₙ,1)]
45.    then raise_error('-3603', R(Tₙ,1).name
46.    ...
47.    when ᵀₙ·R(Tₙ,xTₙ)[1]is not null and
48.         ...
49.         ᵀₙ·R(Tₙ,xTₙ)ᶦᴿ(Tₙ,xTₙ)ᴵ is not null and
50.         not exists
51.              (select 1 from ᴾ(Tₙ,xTₙ)
52.              where ᴾ(Tₙ,xTₙ)·ᴿ(Tₙ,xTₙ)[1]=
                       ᵀₙ·R(Tₙ,xTₙ)[1]
53.              and ᴾ(Tₙ,xTₙ)·ᴿ(Tₙ,xTₙ)[2]=
                       ᵀₙ·R(Tₙ,xTₙ)[2]
54.              ...
55.              and ᴾ(Tₙ,xTₙ)·ᴿ(Tₙ,xTₙ)ᶦᴿ(Tₙ,xTₙ)=
                       ᵀₙ·R(Tₙ,xTₙ)ᶦᴿ(Tₙ,xTₙ)ᴵ)
56.    then raise_error('-3603', ᴿ(Tₙ,xTₙ).name)
57.    when not C(Tₙ,1)(Tₙ.C(Tₙ,1)[1], ...,
       Tₙ.C(Tₙ,1)[ᶦC(Tₙ,1)])
58.    then raise_error('-3603', C(Tₙ,1).name)
59.    ...
60.    when not ·C(Tₙ,yTₙ)ᵀₙ·C(Tₙ,yTₙ)[1], ...,
       ᵀₙ·C(Tₙ,yTₙ)ᶦC(Tₙ,yTₙ)ᴵ)
61.    then raise_error('-3603', C(Tₙ,1).name
62.    else 2
63. end
```

Figure 5:
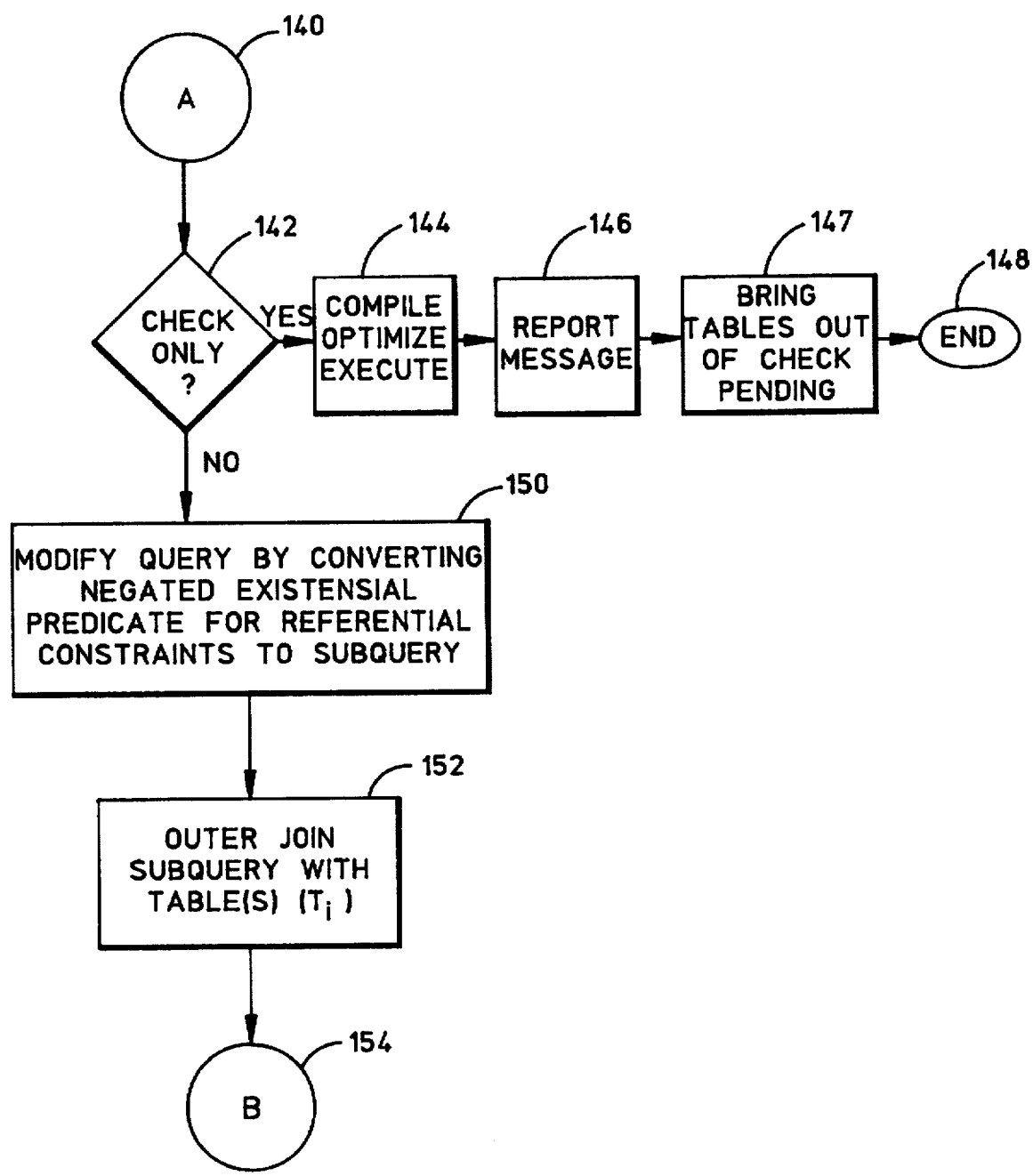

Referring to FIGS. 4 and 5, the processing of the SET CONSTRAINTS method of this invention continues at step 140, signifying the continuity of flow between FIGS. 4 and 5. A determinative step 142 asks if the control program or a user requires only information that an error has occurred when the first constraint violation is found. If so, then this case is denoted as "check only". If "check only" is performed, then in step 144 the query of the type shown in Table 3 is compiled, optimized and executed, according to normal QGM processing discussed with reference to FIG. 1 above. The error data reporting message generated in step 146 is then communicated. For example, it may be passed to display 76 or recorded in mass storage unit 82 for later retrieval. In step 147, if there are no errors, tables are taken out of the pending state. If level 1 information is sufficient, processing ends at step 148.

However, should more than level 1 information be desired, an aspect of this invention for generating further information or deleting the offending records to recover referential integrity may be employed, as described below.

Referring again to FIG. 5 and also to Table 4 shown below, if more than "check only" information is required, processing continues as shown at step 150. Pseudocode representations of the steps 150 through 174 are provided in Table 4 and described below. Therefore, it will be helpful for the reader to refer to Table 4 while following the steps in the flow chart. Before compiling a query, it is modified by convening negated existential predicates for referential constraints to subquery form. For example, step 150 corresponds to lines 47–61 in Table 3. At step 152, the subquery is outer-joined with its corresponding tables, as shown at lines 25–35 of Table 4. Table 4 is also discussed below in connection with FIG. 6.

TABLE 4

```
1.   begin
2.   create temporary table ONEROW(c₁) as (values (1))
3.   insert into E₁
4.   select T₁.c₁,T₁.c₂ ... T₁.c_{m_{T₁}} current timestamp,
5.       case when TEM P_{R(T₁,1)}.x is not null and
6.           T₁.R_{(T₁,1)}[1] is not null and
7.           ...
8.           T₁.R_{(T₁,1)}[z_{R(1,1)}] is not null
9.       then 'R_{(T₁,1)}.name' else "
10.      end ||
11.      ...
12.      case when TEM P_{R(T₁,xT₁)}. x is not null and
13.          T₁.R_{(T₁,xT₁)}[1] is not null and
14.          ...
15.          T₁.R_{(T₁,xT₁)}[z_{R(T₁,xT₁)}] is not null
16.      then 'R_{(T₁,xT₁)}.name' else "
17.      end ||
18.      case when not C_{(T₁,1)}(T₁.C_{(T₁,1)}[1],...,T₁.C_{(T₁,1)}[zc_{(T₁,1)}])
19.      then 'C_{(T₁,1)}.name' else "
20.      end ||
21.      ...
22.      case when not C_{(T₁,yT₁)}(T₁.C_{(T₁,yT₁)}[1],...,
             T₁.C_{(T₁,yT₁)}[zc_{(T₁,yT₁)}])
23.      then 'C_{(T₁,yT₁)}.name' else"
24.      end
25.      from T₁ left outer joint
26.          (select 1
27.          from ONEROW
```

TABLE 4-continued

```
28.      where
29.      not exists
30.          (select 1 from P_{(T₁,1)}
31.          where P_{(T₁,1)}.R_{(T₁,1)}[1] = T₁.R_{(T₁,1)}[1]
32.          and P_{(T₁,1)}.R_{(T₁,1)}[2] = T₁.R_{(T₁,1)}[2]
33.          ...
34.          and P_{(T₁,1)}.R_{(T₁,1)}[z_{R(T₁,1)}] = T₁.R_{(T₁,1)}[z_{R(T₁,1)}]))
35.      as TEM P_{R(T₁,1)}
36.      left outer join ...
37.          (select 1
38.          from ONEROW
39.          where
40.          not exists
41.              (select 1 from P_{(T₁,xT₁)}
42.              where P_{(T₁,xT₁)}.R_{(T₁,xT₁)}[1] = T₁.R_{(T₁,xT₁)}[1]
43.              ...
44.              and P_{(T₁,xT₁)}.R_{(T₁,xT₁)}[z_{R(T₁,xT₁)}] =
                     T₁.R_{(T₁,xT₁)}[z_{R(T₁,xT₁)}]))
45.      as TEM P_{R(T₁,xT₁)}
46.      where (TEM P_{R(T₁,1)}.x is not null and
47.          T₁.R_{(T₁,1)}[1] is not null and
48.          ...
49.          T₁.R_{(T₁,1)}[z_{R(T₁,1)}] is not null)
50.      or
51.      ...
52.      (TEM P_{R(T₁,xT₁)}.x is not null and
53.      T₁.P_{R(T₁,xT₁)}[1] is not null and
54.      ...
55.      T₁.R_{(T₁,xT₁)}[z_{R(T₁,xT₁)}]
56.      or
57.      not C_{(T₁,1)}(T₁.C_{(T₁,1)}[1],...,T₁.C_{(T₁,1)}[zc_{(T₁,1)}])
58.      ...
59.      not C_{(T₁,yT₁)}(T₁.C_{(T₁,yT₁)}[1],...,T₁.C_{(T₁,yT₁)}[zc_{(T₁,yT₁)}])
60.      ...
61.      insert into E_n
62.      select T_n.c₁,T_n.c₂ ... T_n . c_{m_{T_n}}, current timestamp,
63.          case when TEM P_{R(T_n,1)}.x is not null and
64.              T_n.R_{(T_n,1)}[1] is not null and
65.              ...
66.              T_n.R_{(T_n,1)}[z_{R(T_n,1)}] is not null
67.          then 'R_{(T_n,1)}.name' else "
68.          end ||
69.          ...
70.          case when TEM P_{R(T_n,xT_n)}.x is not null and
71.              T_n.R_{(T_n,xT_n)}[1] is not null and
72.              ...
73.              T_n.R_{(T_n,xT_n)}[z_{R(T_n,xT_n)}] is not null
74.          then 'R_{(T_n,xT_n)}.name' else "
75.          end ||
76.          case when not C_{(T_n,1)}(T_n.C_{(T_n,1)}[1],...,T_n.C_{(T_n,1)}[zc_{(T_n,1)}])
77.          then 'C_{(T_n,1)}.name' else "
78.          end ||
79.          ...
80.          case when not C_{(T_n,yT_n)}(T_n.C_{(T_n,yT_n)}[1],...,
                 T_n.C_{(T_n,yT_n)}[zc_{(T_n,yT_n)}])
81.          then 'C_{(T_n,yT_n)}.name' else "
82.          end
```

TABLE 4-continued

| | |
|---|---|
| 83. | from $T_n$ left outer join |
| 84. | (select 1 |
| 85. | from ONEROW |
| 86. | where |
| 87. | not exists |
| 88. | (select 1 from $P_{(T_n,1)}$ |
| 89. | where $P_{(T_n,1)}.R_{(T_n,1)}[1] = T_n.R_{(T_n,1)}[1]$ |
| 90. | and $P_{(T_n,1)}.R_{(T_n,1)}[2] = T_n.R_{(T_n,1)}[2]$ |
| 91. | ... |
| 92. | and $P_{(T_n,1)}.R_{(T_n,1)}[z_{R_{(T_n,1)}}] = T_n.R_{(T_n,1)}[z_{R_{(T_n,1)}}]))$ |
| 93. | as TEM $P_{R_{(T_n,1)}}$ |
| 94. | left outer join ... |
| 95. | (select 1 |
| 96. | from ONEROW |
| 97. | where |
| 98. | not exists |
| 99. | (select 1 from $P_{(T_n,x_{T_n})}$ |
| 100. | where $P_{(T_n,x_{T_n})}.R_{(T_n,x_{T_n})}[1] = T_n.R_{(T_n,x_{T_n})}[1]$ |
| 101. | ... |
| 102. | and $P_{(T_n,x_{T_n})}.R_{(T_n,x_{T_n})}[z_{R_{(T_n,x_{T_n})}}] = T_n.R_{(T_n,x_{T_n})}[z_{R_{(T_n,x_{T_n})}}]))$ |
| 103. | as TEM $P_{R_{(T_n,x_{T_n})}}$ |
| 104. | where (TEM $P_{R_{(T_n,1)}}$.x is not null and |
| 105. | $T_n.R_{(T_n,1)}[1]$ is not null and |
| 106. | ... |
| 107. | $T_n.R_{(T_n,1)}[z_{R_{(T_n,1)}}]$ is not null) |
| 108. | or |
| 109. | ... |
| 110. | (TEM $P_{R_{(T_n,x_{T_n})}}$.x is not null and |
| 111. | $T_n.P_{(T_n,x_{T_n})}[1]$ is not null and |
| 112. | ... |
| 113. | $T_n.R_{(T_n,x_{T_n})}[z_{R_{(T_n,x_{T_n})}}]$ is not null) |
| 114. | or |
| 115. | not $C_{(T_n,1)}(T_n.C_{(T_n,1)}[1],...,T_n.C_{(T_n,1)}[z_{C_{(T_n,1)}}])$ |
| 116. | or ... |
| 117. | not $C_{(T_n,y_{T_n})}(T_n.C_{(T_n,y_{T_n})}[1],...,T_n.C_{(T_n,y_{T_n})}[z_{C_{(T_n,y_{T_n})}}])$ |
| 118. | end |

Figure 6:
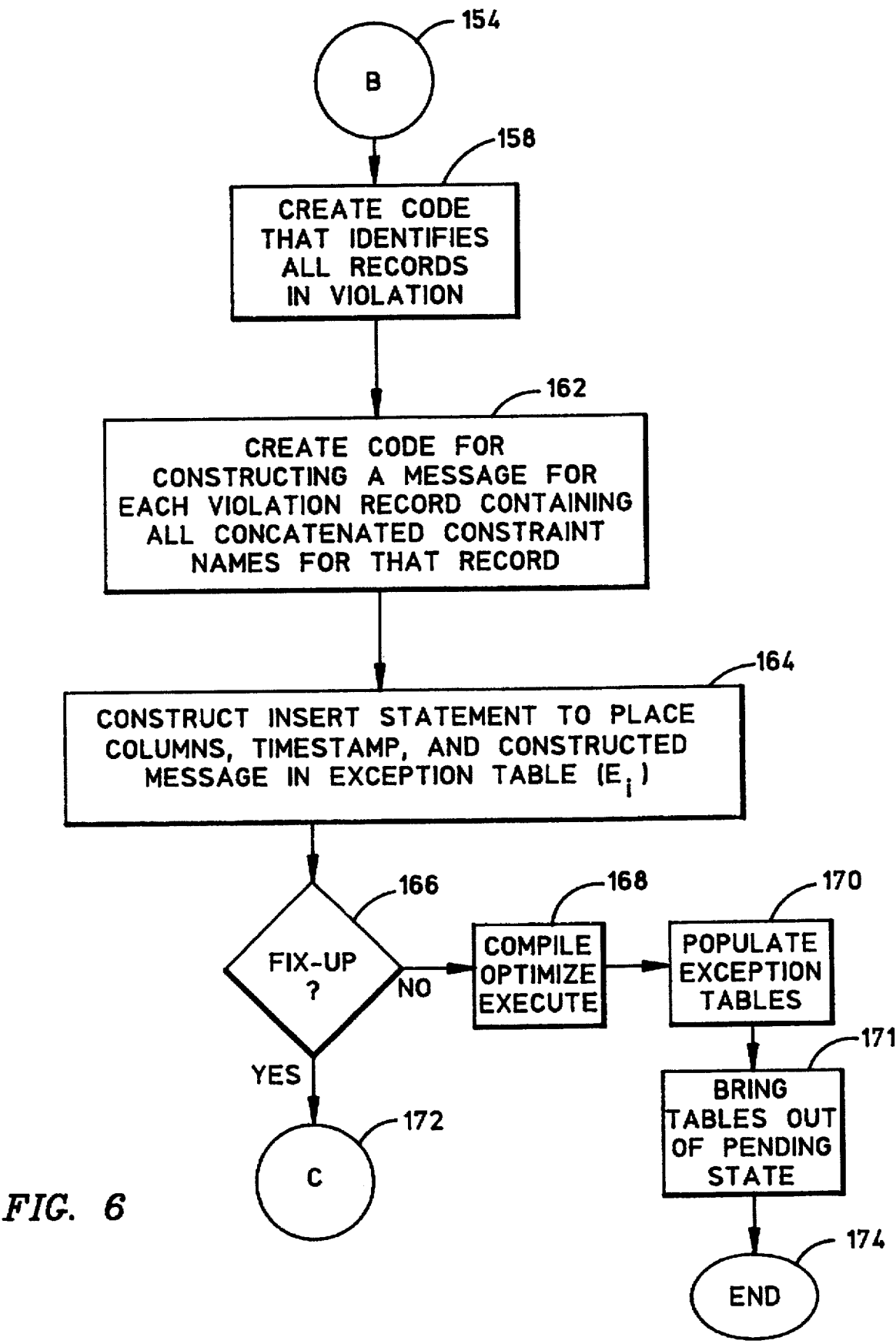

Referring to FIGS. 5 and 6, processing continues from step 154 to step 158. Step 158 creates code that identifies all records in the one or more tables $T_i$ that exhibit constraint violations, either by violating a check constraint or by violating referential integrity. In step 162, the SET CONSTRAINTS module generates code that can construct a message for each record in violation that contains all constraint names for all records in violation. The message contains all of the constraint names concatenated in a string. After the code for creating the messages is created, then, in step 164, the SET CONSTRAINTS module constructs an INSERT statement that serves to place information in a new table. The new table will contain columns identifying records that are in violation of constraints, and will include for each identified record a timestamp indicating a reporting time, and the constructed message. This new table is denominated "the exception table" and is denoted herein as $E_i$.

Referring now to FIGS. 6 and Table 4, the above described information is used to automatically flag an error and identify it, such as "Permissible Age Range Exceeded", and will also show the offending record column entry, such as "19 years of age", as well as the other columns in the record. Preferably, the information includes the timestamp to indicate when the error was flagged. Step 166 inquires if it is desirable to "fix-up" the table(s) having violations. "Fix-up" refers to deleting records in violation of constraints, both primary and referential and also requires removing orphaned records from the database. If no fix-up is desired, steps 168, 170 and 174 are executed. The non-fix-up case ends with step 174. In step 168, the constructed modified query is compiled, optimized and executed according to the normal query translation process described above with reference to FIG. 1. Then, the exception table $E_i$ is populated using the INSERT statement generated in step 164. The non-fix-up case ends in step 174. In step 171, if there are no errors, then tables are brought out of pending state.

Figure 7:
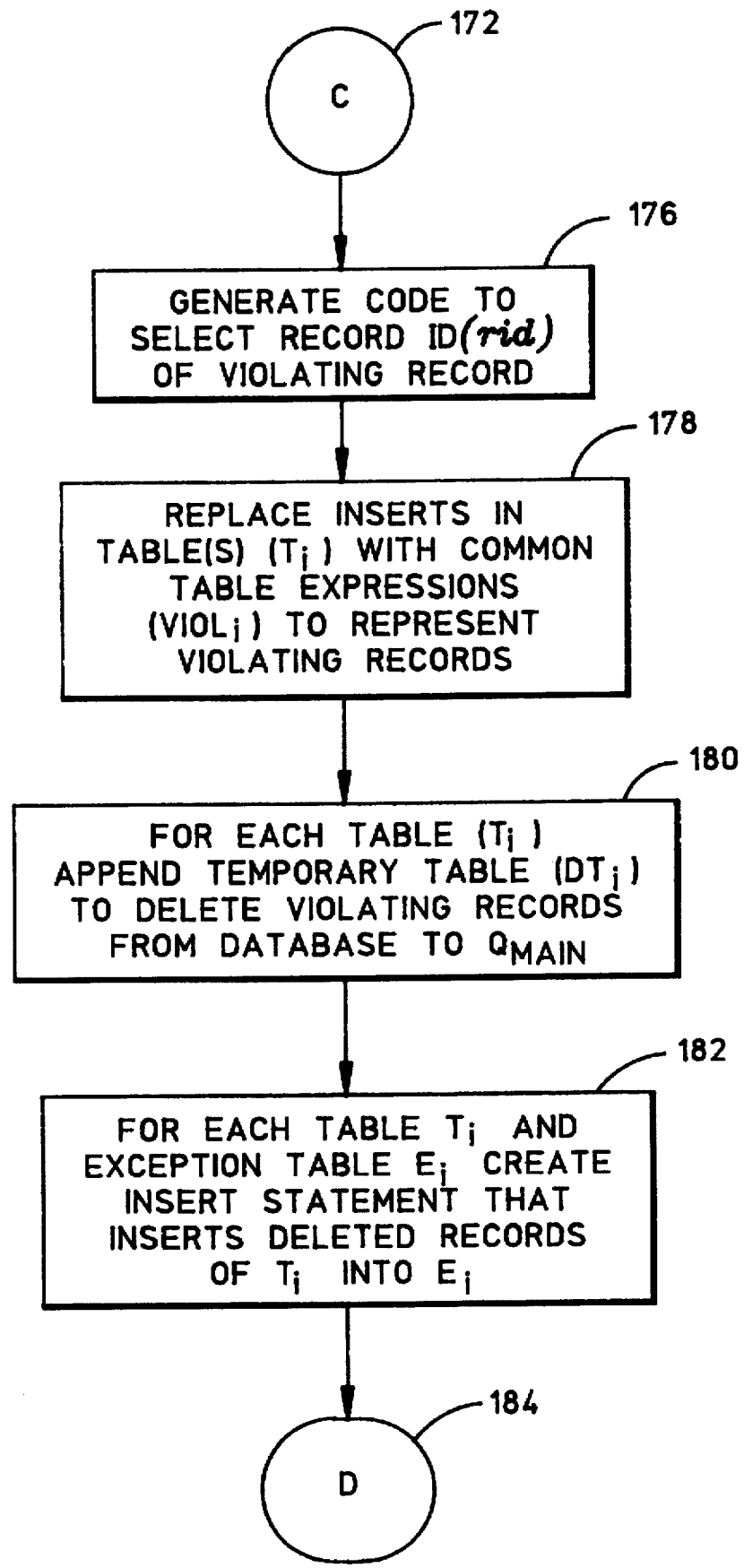

Referring to FIGS. 6 and 7, when repairing the database to erase records with column entry violations, processing continues to step 172. Reference is also made to Table 5 for a pseudocode embodiment of an example implementing the fix-up case described above. In general, a DELETE statement must be applied before the INSERT in order to delete violating records from the database. The deleted records are then inserted into the exception table(s) $E_i$ resulting in the following query:

TABLE 5

| | |
|---|---|
| 1. | begin |
| 2. | create temporary table ONEROW($c_1$) as (values(1)), |
| 3. | create temporary table VIOL$_1$(rid,$c_1,c_2,...,c_{m_{T_1}}$, ts, msg) as |
| 4. | (select $T_1.\#rid,T_1.c_1,T_1.c_2...,T_1.c_{m_{T_1}}$, current timestamp, |
| 5. | case when TEM $P_{R_{(T_1,1)}}$.x is not null and |
| 6. | $T_1.R_{(T_1,1)}[1]$ is not null and |
| 7. | ... |
| 8. | $T_1.R_{(T_1,1)}[z_{R_{(T_1,1)}}]$ is not null |
| 9. | then '$R_{(T_1,1)}$.name' else " |
| 10. | end \|\| |
| 11. | ... |
| 12. | case when TEM $P_{R_{(T_1,x_{T_1})}}$.x is not null and |
| 13. | $T_1.R_{(T_1,x_{T_1})}[1]$ is not null and |
| 14. | ... |
| 15. | $T_1.R_{(T_1,x_{T_1})}[z_{R_{(T_1,1)}}]$ is not null |
| 16. | then '$R_{(T_1,x_{T_1})}$.name' else " |
| 17. | end \|\| |
| 18. | case when not $C_{(T_1,1)}(T_1.C_{(T_1,1)}[1],...,T_1.C_{(T_1,1)}[z_{C_{(T_1,1)}}])$ |
| 19. | then '$C_{(T_1,1)}$.name' else " |
| 20. | end \|\| |
| 21. | ... |
| 22. | case when not $C_{(T_1,y_{T_1})}(T_1.C_{(T_1,y_{T_1})}[1],...,$ |
|    | $T_1.C_{(T_1,y_{T_1})}[z_{C_{(T_2,y_{T_1})}}])$ |
| 23. | then '$C_{(T_1,y_{T_1})}$.name' else" |
| 24. | end |
| 25. | from $T_1$ left outer join |
| 26. | (select 1 |
| 27. | from ONEROW |
| 28. | where |
| 29. | not exists |
| 30. | (select 1 from $P_{(T_1,1)}$ |
| 31. | where $P_{(T_1,1)}.R_{(T_1,1)}[1] = T_1.R_{(T_1,1)}[1]$ |
| 32. | and $P_{(T_1,1)}.R_{(T_1,1)}[2] = T_1.R_{(T_1,1)}[2]$ |
| 33. | ... |
| 34. | and $P_{(T_1,1)}.R_{(T_1,1)}[z_{R_{(T_1,1)}}] = T_1.R_{(T_1,1)}[z_{R_{(T_1,1)}}]))$ |
| 35. | as TEM $P_{R_{(T_1,1)}}$ |
| 36. | left outer join ... |
| 37. | (select 1 |
| 38. | from ONEROW |
| 39. | where |

TABLE 5-continued 40.     not exists
41.        (select 1 from $P_{(T_1,x_{T_1})}$
42.        where $P_{(T_1,x_{T_1})}.R_{(T_1,x_{T_1})}[1] = T_1.R_{(T_1,x_{T_1})}[1]$
43.     ...
44.        and $P_{(T_1,x_{T_1})}.R_{(T_1,x_{T_1})}[z_{R_{(T_1,x_{T_1})}}] = T_1.R_{(T_1,x_{T_1})}[z_{R_{(T_1,x_{T_1})}}]))$
45.     as TEM $P_{R_{(T_1,x_{T_1})}}$
46.     where (TEM $P_{R_{(T_1,1)}}.x[1]$ is not null and
47.        $T_1.R_{(T_1,1)}[1]$ is not null and
48.     ...
49.        $T_1.R_{(T_1,1)}[z_{R_{(T_1,1)}}]$ is not null)
50.     or
51.     ...
52.     (TEM $P_{R_{(T_1,x_{T_1})}}.x$ is not null and
53.        $T_1.R_{(T_1,x_{T_1})}[1]$ is not null and
54.     ...
55.        $T_1.R_{(T_1,x_{T_1})}[z_{R_{(T_1,x_{T_1})}}]$ is not null)
56.     or
57.        when not $C_{(T_1,1)}(T_1.C_{(T_1,1)}[1],...,T_1.C_{(T_1,1)}[z_{C_{(T_1,1)}}])$
58.     ...
59.        when not $C_{(T_1,y_{T_1})}(T_1.C_{(T_1,y_{T_1})}[1],...,T_1.C_{(T_1,y_{T_1})}[z_{C_{(T_1,y_{T_1})}}])$
60.     ...
61.     create temporary table $VIOL_n(rid,c_1,c_2,...,c_{m_{T_n}}, ts, msg)$ as
62.        (select $T_n.c_1,T_n.c_2...,T_n.c_{m_{T_n}}$, current timestamp,
63.        case when TEM $P_{R_{(T_n,x_{T_n})}}.x$ is not null and
64.        $T_n.R_{(T_n,1)}[1]$ is not null and
65.     ...
66.        $T_n.R_{(T_n,1)}.[z_{R_{(T_n,1)}}]$ is not null
67.        then '$R_{(T_n,1)}$.name' else "
68.        end ||
69.     ...
70.        case when TEM $P_{R_{(T_n,x_{T_n})}}.x$ is not null and
71.        $T_n.R_{(T_n,x_{T_n})}[1]$ is not null and
72.     ...
73.        $T_n.R_{(T_n,x_{T_n})}.[z_{R_{(T_n,x_{T_n})}}]$ is not null
74.        then '$R_{(T_n,x_{T_n})}$.name' else "
75.        end ||
76.        case when not $C_{(T_n,1)}(T_n.C_{(T_n,1)}[1],...,T_n.C_{(T_n,1)}[z_{C_{(T_n,1)}}])$
77.        then '$C_{T_n,1}$' '.name' else"
78.        end ||
79.     ...
80.        case when not $C_{(T_n,y_{T_n})}(T_n.C_{(T_n,y_{T_n})}[1],...,$
           $T_n.C_{(T_n,y_{T_n})}[z_{C_{(T_n,y_{T_n})}}])$
81.        then '$C_{(T_n,y_{T_n})}$.name' else"
82.        end
83.     from $T_n$ left outer join
84.        (select 1
85.        from ONEROW
86.        where
87.        not exists
88.            (select 1 from $P_{(T_n,1)}$
89.            where $P_{(T_n,1)}.R_{(T_n,1)}[1] = T_n.R_{(T_n,1)}[1]$
90.            and $P_{(T_n,1)}.R_{(T_n,1)}[2] = T_1.R_{(T_n,1)}[2]$
91.     ...
92.            and $P_{(T_n,1)}.R_{(T_n,1)}[z_{R_{(T_n,1)}}] = T_n.R_{(T_n,1)}[z_{R_{(T_n,1)}}]))$
93.     as TEM $P_{R_{(T_n,1)}}$
94.     left outer join ...
95.        (select 1
96.        from ONEROW
97.        where
98.        not exists
99.            (select 1 from $P_{(T_n,x_{T_n})}$
100.            where $P_{(T_n,x_{T_n})}.R_{(T_n,x_{T_n})}[1] = T_n.R_{(T_n,x_{T_n})}[1]$
101.     ...
102.            and $P_{(T_n,x_{T_n})}.R_{(T_n,x_{T_n})}[z_{R_{(T_n,x_{T_n})}}] = T_n.R_{(T_n,x_{T_n})}[z_{R_{(T_n,x_{T_n})}}]))$
103.     as TEM $P_{R_{(T_n,x_{T_n})}}$
104.     where (TEM $P_{R_{(T_n,1)}}.x$ is not null and
105.        $T_n.R_{(T_n,1)}[1]$ is not null and
106.     ...
107.        $T_n.R_{(T_n,1)}[z_{R_{(T_n,1)}}]$ is not null)
108.     or
109.     ...
110.     (TEM $P_{R_{(T_n,x_{T_n})}}.x$ is not null and
111.        $T_n.R_{(T_n,x_{T_n})}[1]$ is not null and
112.     ...
113.        $T_n.R_{(T_n,x_{T_n})}[z_{R_{(T_n,x_{T_n})}}]$ is not null)
114.     or
115.        not $C_{(T_n,1)}(T_n.C_{(T_n,1)}[1],...,T_n.C_{(T_n,1)}[z_{C_{(T_n,1)}}])$
116.     or ...
117.        not $C_{(T_n,y_{T_n})}(T_n.C_{(T_n,y_{T_n})}[1],...,T_n.C_{(T_n,y_{T_n})}[z_{C_{(T_n,y_{T_n})}}])$;
118.     select * from $VIOL_1$;
119.     ...
120.     select * from $VIOL_n$;
121.     create temporary table $DT_1(c_1,c_2,...,c_{m_{T_1}},ts,msg)$ as
122.        (delete $VIOL_1.c_1,VIOL_1.c_2,...,$
           $VIOL_1.c_{m_{T_1}},VIOL_1,ts,VIOL_1.msg$
123.     from $T_1$, $VIOL_1$
124.     where $T_1.\#rid = VIOL_1.rid$);
125.     ...
126.     create temporary table $DT_n(c_1,c_2,...,c_{m_{T_1}},ts,msg)$ as
127.        (delete $VIOL_n.c_1,VIOL_n.c_2,...,$
           $VIOL_n.c_{m_{T_n}},VIOL_n,ts,VIOL_n.msg$
128.     from $T_n$, $VIOL_n$
129.     where $T_n.\#rid = VIOL_n.rid$);
130.     insert into $E_1$
131.     select $c_1,c_2,...,c_{m_{T_1}},ts,msg$
132.     from $DT_1$;
133.     ...
134.     insert into $E_n$
135.     select $c_1,c_2,...,c_{m_{T_n}},ts,msg$
136.     from $DT_n$;
137. end With reference now to FIG. 7 and also to Table 5, shown above, the processing of the SELECT CONSTRAINT module implementing the fix-up case is described. In step 176, the module selects each record id (rid) for each record having violating entries. In step 178, the module implements a fix-up process, by replacing INSERTS with common table expressions ($VIOL_i$) to represent violating records. For example, the pseudocode representation of steps 176 and 178 is shown in Table 5 at lines 3–4. In step 180, the module creates a temporary table $DT_i$ that is used later to select violating records to be deleted from the database. The pseudocode representation of step 180 is shown in Table 5 at lines 121–129. Step 182 creates code to insert the deleted records in the exception table by first creating an INSERT statement to perform this activity. An exception table $E_i$ exists for each bulk-loaded table $T_i$. The pseudocode for carrying out step 182 is shown in Table 5 at lines 130–137. The exception table is essentially a violation table that is used to flag all errors designating violations inherent in the original data before any violating records are deleted.

Figure 8:
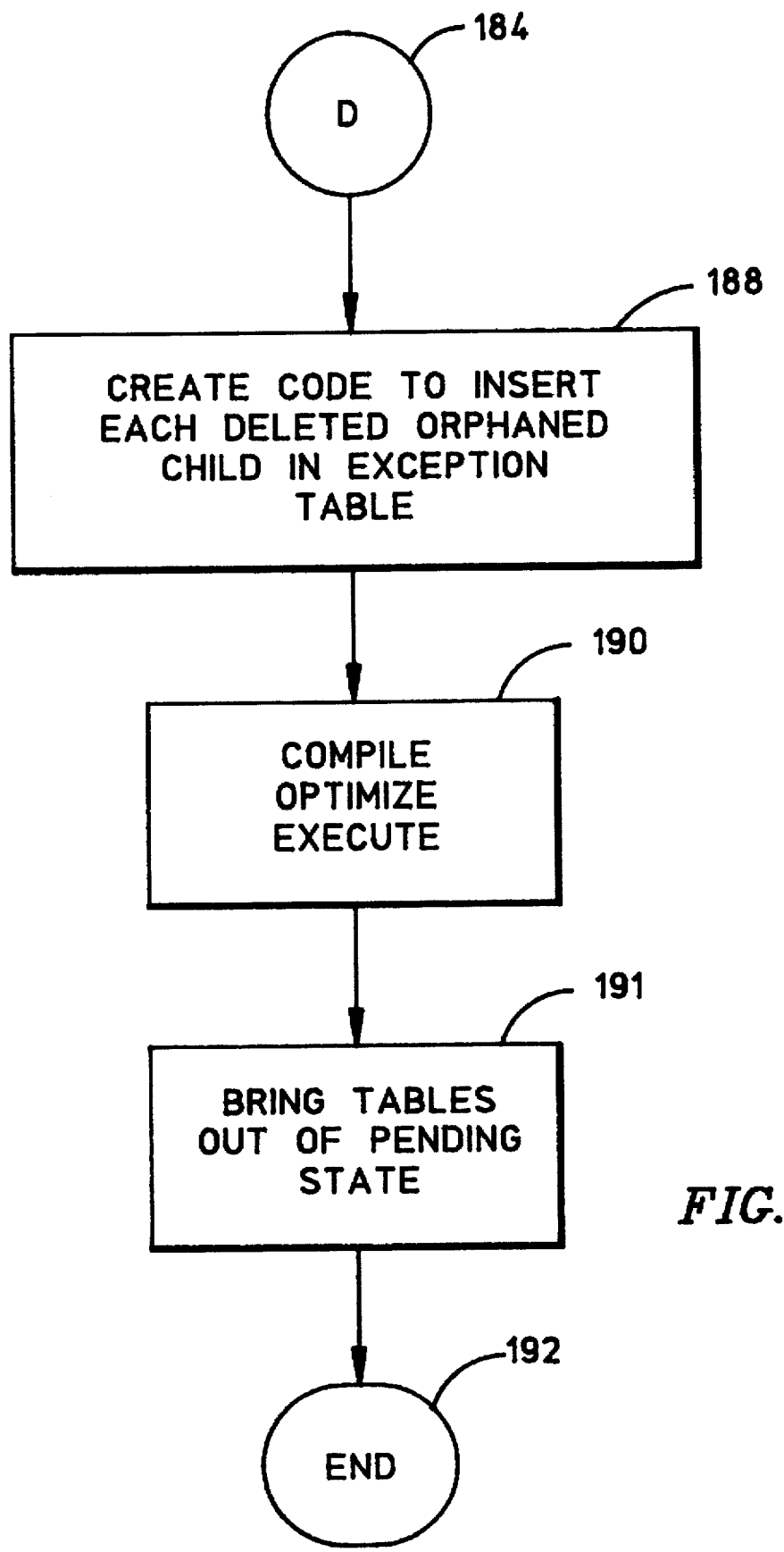

Referring to FIG. 8, processing continues from FIG. 7 as step 184 flows into step 188. The presence of the DELETE from a parent table in the query causes the constraint compiler to naturally compile in the code that eliminates orphan records, as shown in step 188. In this way, the orphaned children records can be inspected before they are erased. In step 190, the system of FIG. 3 carries out the constructed code created in the above steps, wherein the query is compiled, optimized, and executed in normal fashion, as described above with reference to FIG. 1. The tables are brought out of pending state in step 191. Processing of the method of this invention by the system of FIG. 3 ends in step 192.

Example of Implementation of the Method

Figure 9A:
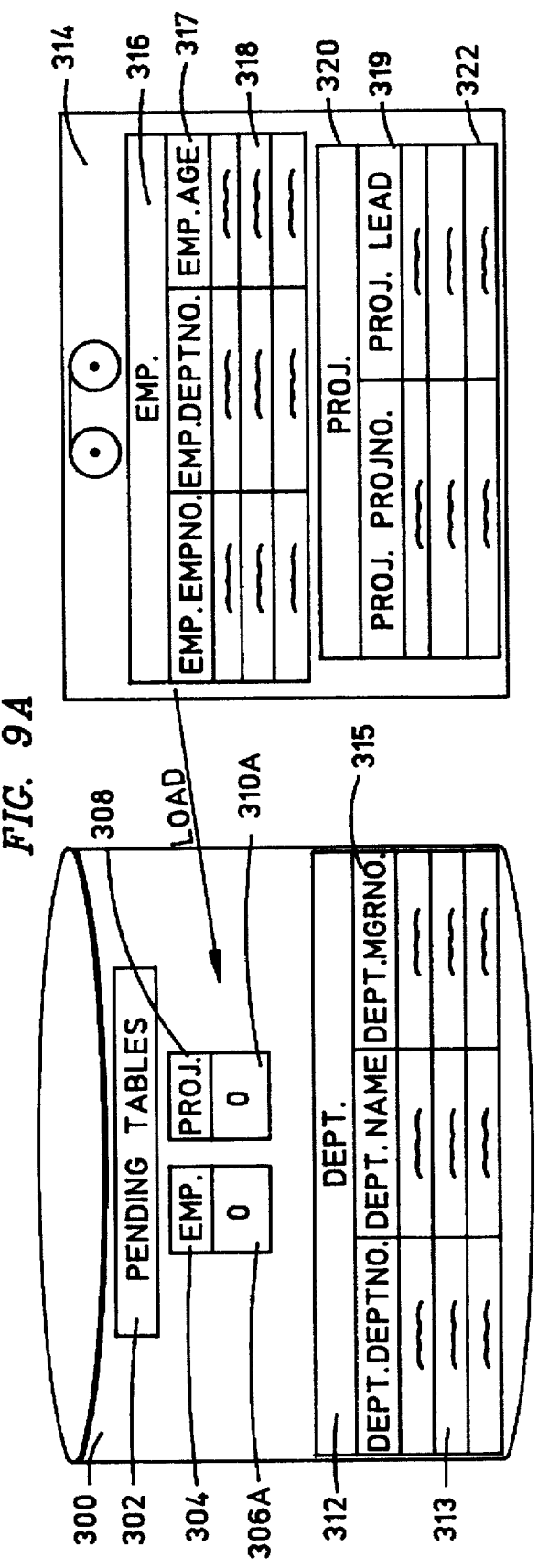
FIG. 9A shows an example of data to be bulk-loaded into empty tables in a database.
Figure 9B:
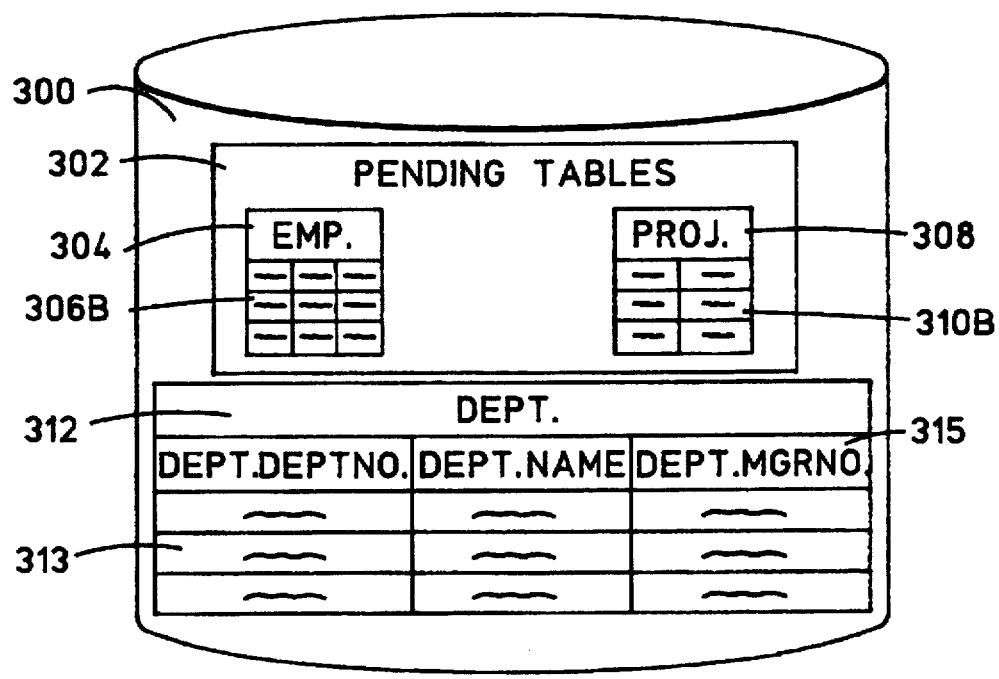
FIG. 9B shows the example of the tables of the database of FIG. 9A that are bulk-loaded with data and placed in a pending state such that the bulk data constraints checking method of this invention may be applied by the system of FIG. 3 according to the flow chart of FIGS. 4–8.
Figure 9C:
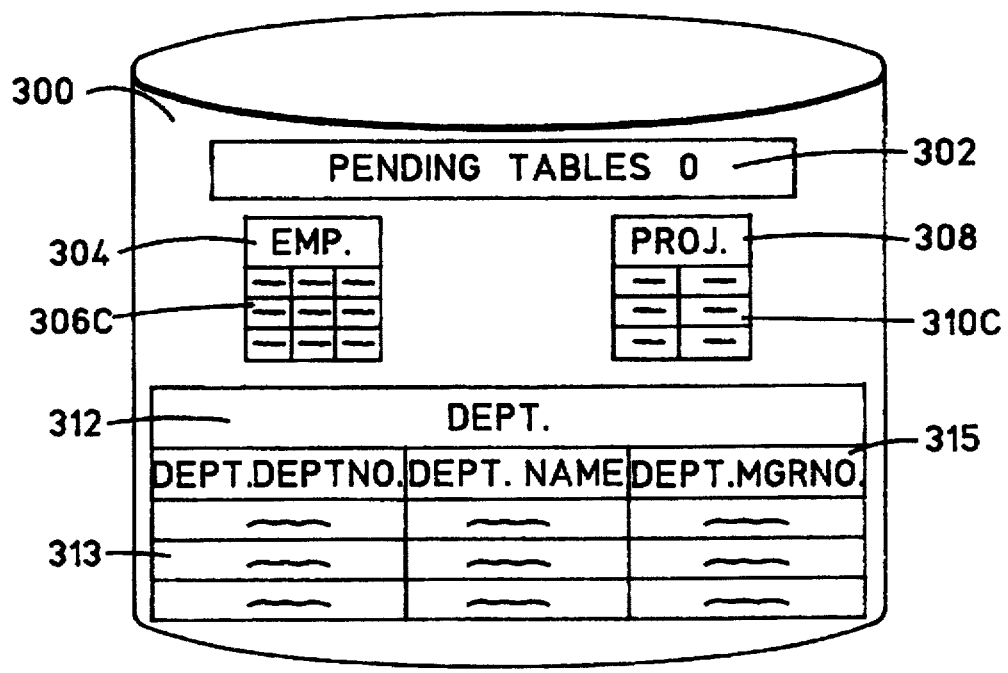
FIG. 9C shows the example of the pending database tables of FIG. 9B after the respective bulk data in each table has been checked for constraints, according to the method of this invention and with the system of this invention.

Referring to FIGS. 9A–9C, a specific example is shown to illustrate an application of the method of the invention employing general case of the preferred embodiment of the pseudocode of Tables 1–5. The general case pseudocode is shown in a modified state, as the specific example values are substituted in Tables 6–10.

In FIG. 9A, three tables 304, 308 and 312 are shown stored on storage unit 300. The empty tables 304 and 308 are created to store employee (EMP) information and project (PROJ) information, respectively. State 302 indicates a pending state, which the tables will be placed in at the time of receiving data that remains to be checked. Table 304 is empty because data 306A is an empty string or simply blank. Data 310A of empty table 308 is also blank. The table 312 contains department (DEPT) information and its data area 313 contains information regarding departments.

Tables 304, 308 and 312 are created according to the following definitions:

| | |
|---|---|
| create table EMP | (empno int not null primary key, deptno int, age int, constraint EMPDEPT foreign key (deptno) references DEPT, constraint MINAGE age > 16); |
| create table DEPT | (deptno int not null primary key, name varchar(20), mgrno int) ; and |
| create table PROJ | projno int not null primary key, lead int, constraint PROJLEAD foreign key (lead) references EMP). |

Again referring to FIG. 9A, tape unit 314 contains an EMP table 316 having data 318 and a PROJ table 320 having data 322. The data from the tables on the tape is to be bulk-loaded into the empty tables on storage unit 300. The EMP table contains columns 317, denoted as EMP.EMPNO, EMP.DEPTNO, and EMP.AGE, defining in respective order the employee number, department number, and age of each employee. The PROJ table contains columns 319 denoted as PROJ.PROJNO and PROJ.LEAD, defining in respective order the project number and project leader. The project leader is an employee that must also be identified by the EMP table.

Referring to FIG. 9B, when a well-known bulk-loading facility is used to download data into the tables, the EMP and PROJ tables are populated with data from the tape and are placed in the pending state. Thus, the EMP table 304 contains new data 306B, and the PROJ table 308 contains new data 310B. However, the tables are in the pending state 302, meaning they cannot be used. Table 312, containing data 313, unaffected by the bulk-loading, remains in a usable (non-pending) state. The DEPT table contains the columns 315 denoted as DEPT.DEPTNO, DEPT.NAME and DEPT.MGRNO, defining respectively the department number, department name, and the department manager's number.

Referring to FIG. 9C, after applying the constraint-checking mechanism enabled by this invention, the pending state 302 no longer refers to the EMP and PROJ tables. After constraint checking, the data 306C and 310C of respective tables 304 and 308 is usable. The department table 312 which is used for ensuring referential integrity of its data 313 is also usable.

After constraint checking, the following constraint conditions must be met. The EMP.DEPTNO column of table 304 must have referential integrity with a record in the DEPT table 312. Further, the EMP.AGE column must be checked for violation of constraint MINAGE. Assume this constraint is that the minimum employee age must be 16 years (e.g., EMP.AGE $\geq$ 16). The PROJ.LEAD column of the PROJ table must also be checked to ensure referential integrity with an EMP.EMPNO identified in the EMP table.

With these constraints in mind, the preferred general case pseudocode shown in Tables 5–9 is illustrated below with substituted values derived from the example case of the tables of FIGS. 9A–9C.

Referring to Table 6, a dummy INSERT query is generated with an INSERT statement for each table, as shown below:

TABLE 6

| | |
|---|---|
| 1. | begin |
| 2. | insert into EMP select * from EMP; |
| 3. | insert into PROJ select * from PROJ; |
| 4. | end |

Referring to Table 7, when the dummy INSERT query is generated, then the processor calls the constraints compiler 24 to compile the INSERT commands and check for constraint violations according to the constraint rules described above with reference to FIGS. 9A–9C. The resulting query is shown below.

TABLE 7

| | |
|---|---|
| 1. | begin |
| 2. | with $I_{EMP}$ as insert into EMP select * from EMP |
| 3. | select 1 |
| 4. | from $I_{EMP}$ |
| 5. | where 1=case |
| 6. | when $I_{EMP}$.deptno is not null and |
| 7. | not exists |
| 8. | (select 1 from DEPT.deptno |
| 9. | where DEPT.deptno = $I_{EMP}$.deptno) |
| 10. | then raise__error('-3603', EMPDEPT) |

TABLE 7-continued

```
11.             when not (I_EMP.age > 16)
12.             then raise_error('-3603', MINAGE)
13.             else 2
14.         end
15.     with I_PROJ as insert into PROJ select * from PROJ
16.     select 1
17.     from I_PROJ
18.     where 1=case
19.             when I_PROJ.lead is not null and
20.                 not exists
21.                     (select 1 from EMP
22.                     where EMP.empno = I_PROJ.lead)
23.             then raise_error('-3603', PROJLEAD)
24.             else 2
25.         end
26. end
```

Referring to Table 8, the query is modified to replace any INSERT statements with SELECT statements. The resulting query is shown below.

TABLE 8

```
1.  begin
2.      select 1
3.      from EMP
4.      where 1=case
5.              when EMP.deptno is not null and
6.                  not exists
7.                      (select 1 from DEPT.deptno
8.                      where DEPT.deptno = EMP.deptno)
9.              then raise_error('-3603', EMPDEPT)
10.             when not EMP.age > 16)
11.             then raise_error('-3603', MINAGE)
12.             else 2
13.         end
14.     select 1
15.     from PROJ
16.     where 1 = case
17.             when PROJ.lead is not null and
18.                 not exists
19.                     (select 1 from EMP
20.                     where EMP.empno = PROJ.lead)
21.             then raise_error('-3603', PROJLEAD)
22.             else 2
23.         end
24. end
```

This query is compiled, optimized and executed to report that a violation has been found. If it is desired to report all records that violate constraints, and what those constraints are, then it is necessary to create exception tables. Thus, for each record from table EMP or PROJ that violates at least one constraint, it is necessary to insert a record into an exception table $E_{EMP}$ or $E_{PROJ}$ (respectively) that contains each column of the violating record. Preferably, the timestamp and an identifying message that is a concatenating name of all constraint violations is also placed in the table. The resulting query is shown below in Table 9.

TABLE 9

```
1.  begin
2.      create temporary table ONEROW(c_1) as (values (1));
3.      insert into E_EMP
4.      select EMP.empno, EMP.deptno, EMP.age, current timestamp,
5.              case when TEMP_EMPDEPT.x is not null and
6.                   EMP.deptno is not null
7.                   then 'EMPDEPT' else ''
8.              end ||
9.              case when not (age > 16)
10.                  then 'MINAGE' else ''
```

TABLE 9-continued

```
11.             end
12.     from EMP left outer join
13.         (select 1
14.         from ONEROW
15.         where
16.         not exists
17.             (select 1 from DEPT
18.             where DEPT.deptno = EMP.deptno)) as TEMP_EMPDEPT
19.     where TEMP_EMPDEPT.x is not null and
20.         EMP.deptno is not null
21.     or
22.     not (age > 16);
23.     insert into E_PROJ
24.     select PROJ.projno, PROJ.lead, current timestamp,
25.             case when TEMP_PROJLEAD.x is not null and
26.                  PROJ.lead is not null
27.                  then 'PROJLEAD' else ''
28.             end ||
29.     from PROJ left outer join
30.         (select 1
31.         from ONEROW
32.         where
33.         not exists
34.             (select 1 from EMP
35.             where EMP.empno = PROJ.lead)) as TEMP_PROJLEAD
36.     where TEMP_PROJLEAD.x is not null and
37.         PROJ.lead is not null;
38. end
```

For the fix-up case, a DELETE statement must be applied before the INSERT statement to delete any violating records from the database. The deleted records are thus inserted into the exception tables. This results in the following query.

TABLE 10

```
1.  begin
2.      create temporary table ONEROW(c_1) as (values (1));
3.      create temporary table with VIOL_EMP (rid, empno,
        deptno, age, ts, msg) as
4.          (select EMP.#rid, EMP.empno, EMP.deptno,
            EMP.age, current timestamp,
5.              case when TEMP_EMPDEPT.x is not null and
6.                   EMP.deptno is not null
7.                   then 'EMPDEPT' else ''
8.              end ||
9.              case when not (age > 16)
10.                  then 'MINAGE' else ''
11.             end
12.     from EMP left outer join
13.         (select 1
14.         from ONEROW
15.         where
16.         not exists
17.             (select 1 from DEPT
18.             where DEPT.deptno = EMP.deptno))
                as TEMP_EMPDEPT
19.     where (TEMP_EMPDEPT.x is not null and
20.         EMP.deptno is not null)
21.     or
22.     not (age > 16));
23.     create temporary table VIOL_PROJ (rid, projno, lead, ts, msg) as
24.         (select PROJ.projno, PROJ.lead, current timestamp,
25.             case when TEMP_PROJLEAD.x is not null and
26.                  PROJ.lead is not null
27.                  then 'PROJLEAD' else ''
28.             end
29.     from PROJ left outer join
30.         (select 1
31.         from ONEROW
32.         where
33.         not exists
34.             (select 1 from EMP
35.             where EMP.empno = PROJ.lead))
                as TEMP_PROJLEAD
36.     where TEMP_PROJLEAD.x is not null and
```

TABLE 10-continued

```
37.            PROJ.lead is not null)
38.        select * from VIOL_EMP;
39.        select * from VIOL_PROJ;
40.        create temporary table DT_EMP(empno, deptno, age, ts, msg) as
41.            (delete VIOL_EMP.empno, VIOL_EMP.deptno, VIOL_EMP.age,
                   VIOL_EMP.ts, VIOL_EMP.msg
42.            from EMP, VIOL_EMP
43.            where EMP.#rid = VIOL_EMP.rid);
44.        create temporary table DT_PROJ (projno, lead, ts, msg) as
45.            (delete VIOL_PROJ.projno, VIOL_PROJ.lead, VIOL_PROJ.ts,
                   VIOL_PROJ.msg
46.            from PROJ, VIOL_PROJ
47.            where PROJ.#rid = VIOL_PROJ.rid);
48.        insert into E_EMP
49.        select empno, deptno, age, ts, msg
50.        from DT_EMP;
51.        insert into E_PROJ
52.        select projno, lead, ts, msg
53.        from DT_PROJ;
54. end
```

To enforce the CASCADE function, the constraint processor compiles additional code that modifies the query of Table 10 to DELETE all records from PROJ that are orphaned by deletes of records from EMP. This results in the following query.

TABLE 11

```
1.  begin
2.      create temporary table ONEROW(c_1) as (values (1))
3.      create temporary table VIOL_EMP(rid, empno, deptno, age, ts, msg) as
4.          (select EMP.#rid, EMP.empno, EMP.deptno, EMP.age, current timestamp,
5.              case when TEMP_EMPDEPT.x is not null and
6.                      EMP.deptno is not null
7.                  then 'EMPDEPT' else ''
8.              end ||
9.              case when not (age > 16)
10.                 then 'MINAGE' else ''
11.             end
12.         from EMP left outer join
13.             (select 1
14.             from ONEROW
15.             where
16.             not exists
17.                 (select 1 from DEPT
18.                 where DEPT.deptno = EMP.deptno)) as TEMP_EMPDEPT
19.         where (TEMP_EMPDEPT.x is not null and
20.             EMP.deptno is not null)
21.         or
22.         not (age > 16))
23.     create temporary table VIOL_PROJ (rid, projno, lead, ts, msg) as
24.         (select PROJ.projno, PROJ.lead, current timestamp,
25.             case when TEMP_PROJLEAD.x is not null and
26.                     PROJ.lead is not null
27.                 then 'PROJLEAD' else ''
28.             end
29.         from PROJ left outer join
30.             (select 1
31.             from ONEROW
32.             where
33.             not exists
34.                 (select 1 from EMP
35.                 where EMP.empno = PROJ.lead)) as TEMP_PROJLEAD
36.         where TEMP_PROJLEAD.x is not null and
37.             PROJ.lead is not null)
38.     select * from VIOL_EMP;
39.     select * from VIOL_PROJ;
40.     create temporary table DT_EMP (empno, deptno, age, ts, msg) as
41.         (delete VIOL_EMP.empno, VIOL_EMP.deptno, VIOL_EMP.age, VIOL_EMP.ts, VIOL_EMP.msg
42.         from EMP, VIOL_EMP
43.         where EMP.#rid = VIOL_EMP.rid);
44.     create temporary table DT_PROJ (projno, lead, ts, msg) as
45.         (delete VIOL_PROJ.projno, VIOL_PROJ.lead, VIOL_PROJ.ts, VIOL_PROJ.msg
46.         from PROJ, VIOL_PROJ
47.         where PROJ.#rid = VIOL_PROJ.rid);
48.     insert into E_EMP
49.     select empno, deptno, age, ts, msg
50.     from DT_EMP;
51.     insert into E_PROJ
52.     select projno, lead, ts, msg
53.     from DT_PROJ;
54.     delete from PROJ, DT_EMP
55.     where PROJ.lead = DT_EMP.empno;
56. end
```

Set Constraints Syntax

Figure 10:
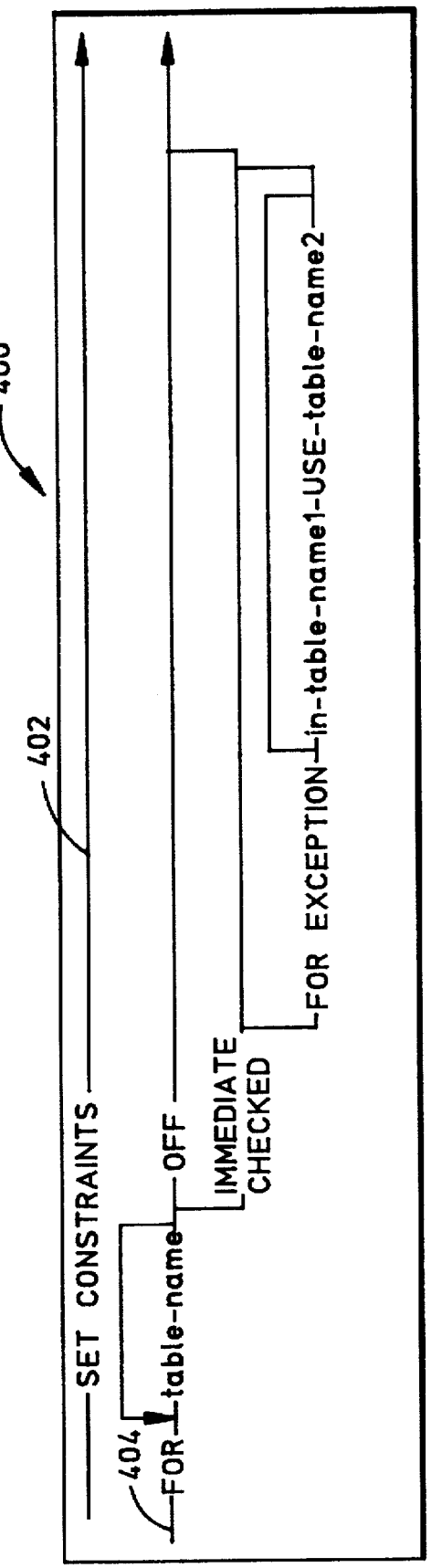
FIG. 10 shows command syntax useful for implementing this invention.

Referring to FIG. 10, the following example of a syntax diagram 400 for a SET CONSTRAINTS command is purely exemplary, but should be useful in illustrating the capabilities of the present invention, and will aid one skilled in the art in making and using the invention. The command line 404 contains the required syntactical statement, "SET CONSTRAINTS." This statement combined with "IMMEDIATE CHECKED" can be used to invoke the module. It is also required that a TABLE-NAME be identified for being checked for constraint violations, as illustrated in line 404. The SET CONSTRAINTS command may be invoked with a clause FOR IMMEDIATE CHECKED, that designates the checking is to begin immediately. The FOR-EXCEPTION clause designates that any row that is in violation of a FOREIGN KEY or CHECK key restraint will be copied to an exception table, such as table $E_i$, and deleted from the original table. The IN TABLE-NAME1 clause specifies the table from which rows that violate constraints are to be copied. The USE TABLE-NAME2 clause specifies the particular exception table into which error rows are to be copied. Other variations of the illustrated syntax may be employed without deviating from the scope or spirit of the invention.

Figure 11:
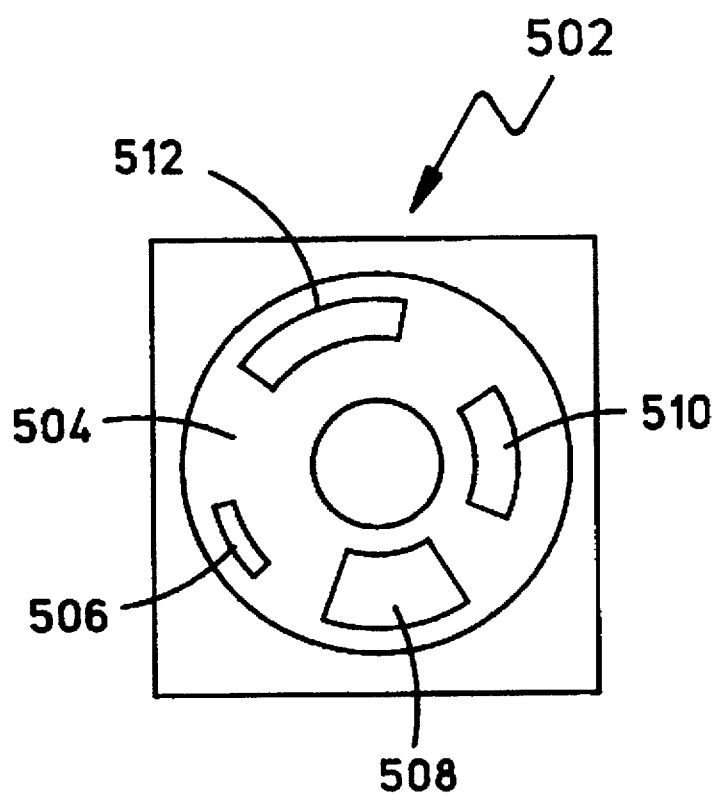
FIG. 11 shows a computer program product recording medium useful for storing the software embodiment of this invention.

While this invention is primarily discussed as a method, it can be understood by a person of ordinary skill in the art that the apparatus discussed above in connection with FIG. 3 may be programmed or otherwise designed to facilitate the practice of the method of this invention. Also, an article of manufacture, such as the prerecorded floppy disk 502 in FIG. 11 or other similar computer program product, for use with a data processing system, could include a storage medium, such as magnetic storage medium 504, and program means recorded thereon, such as the program means 506, 508, 510 and 512 in FIG. 10, for directing the data processing system to facilitate the practice of the method of this invention. It will be understood that such apparatus and articles of manufacture also fall within the spirit and scope of this invention.

Other embodiments and modifications of this invention may occur to those of ordinary skill in the art in view of these teachings. Therefore, this invention is limited only by the following claims, which include all such embodiments and modifications when viewed in conjunction with the above specification and accompanying drawing.

What is claimed is:

1. In a relational database management system (RDMS) having a query compiler with a constraint engine and memory including mass storage for storing a database that has at least one table $T_i$ containing a plurality of data records, each data record being uniquely identifiable in the RDMS, wherein the RDMS system further has a data processor for processing queries represented by a query graph, a method for checking for constraint violations in a data record in the table $T_i$, the method comprising the steps of:

generating an insert query $Q_{MAIN}$ for inserting one or more records into the table $T_i$;

compiling the insert query $Q_{MAIN}$ to produce compiled insert commands including insert code and checking code to check for constraint violations in one or more records specified by the insert query $Q_{MAIN}$;

modifying the query $Q_{MAIN}$ by replacing the insert code with compiled select commands to produce modified code having select code and the checking code; and, constraint checking each record in the table $T_i$ with the modified code.

2. The method of claim 1, wherein the modified code reports at least one constraint violation in an error reporting data message.

3. The method of claim 2, wherein the modified code identifies and reports all the records in the table $T_i$ that exhibit constraint violations.

4. The method of claim 3, wherein the modified code reports a string for each record in table $T_i$ exhibiting a constraint violation, the string containing concatenated constraint names, each constraint name of the concatenated constraint names corresponding to a constraint violation exhibited by the record.

5. The method of claim 4, wherein the RDMS further includes an exception table stored in memory and further comprising the step of:

constructing an insert command to place the record identifier for each record exhibiting a constraint violation in the exception table $E_i$ and also to place each corresponding string containing concatenated constraint names in the exception table $E_i$.

6. The method of claim 5, wherein the constructed insert command is adapted to place a timestamp to indicate the time of error in the exception table $E_i$.

7. The method of claim 5, wherein the constructed insert command is executed, thereby causing the exception table $E_i$ to be populated with the column entries of records exhibiting a constraint violation, and an error reporting message for each record exhibiting a constraint violation.

8. The method of claim 6, wherein the constructed insert command is executed, thereby causing the exception table $E_i$ to be populated with the column entries of records exhibiting a constraint violation, an error reporting message for each record exhibiting a constraint violation, and the timestamp for each record exhibiting a constraint violation.

9. The method of claim 5, and further comprising the steps of fixing the table $T_i$ to eliminate violating records by:

(a) selecting each record in the table $T_i$ that is identified as exhibiting a constraint violation; and (b) deleting each record selected in step 9(a).

10. The method of claim 9, and further comprising the step of creating a record insert command to enable inserting a copy of any records deleted in step 9(b) in the exception table $E_i$.

11. The method of claim 8, and further comprising the steps of fixing the table $T_i$ to eliminate violating records by:

(a) selecting each record in the table $T_i$ that is identified as exhibiting a constraint violation; and (b) deleting each record selected in step 11(a).

12. The method of claim 11, and further comprising the step of executing the record insert command, thereby populating the exception table $E_i$ with a copy of records deleted in step 9(b).

13. The method of claim 12, wherein any deleted parent records from $T_1$ are used to identify any child record that has been orphaned by the deletion of their parent records in the table $T_i$ and those identified orphaned child records are deleted by issuing a cascade delete command.

14. The method of claim 13, wherein a copy of each deleted orphaned child record is inserted in the exception table $E_i$.

15. In a relational database management system (RDMS) having a compiler with a constraint engine and memory including mass storage, for storing a database that has at least one table $T_i$ containing a plurality of data records, each data record being uniquely identifiable in the RDMS, wherein the RDMS system further has a data processor for processing queries represented by a query graph, and the RDMS system further includes an exception table $E_i$ stored in memory, a method for checking for constraint violations in a data record in the table $T_i$, the method comprising the steps of:

- generating an insert query $Q_{MAIN}$ for inserting one or more records into the table $T_i$;
- compiling the insert query $Q_{MAIN}$ to produce compiled insert commands including insert code and checking code to check for constraint violations in one or more records specified by the insert query $Q_{MAIN}$;
- modifying the query $Q_{MAIN}$ by replacing the insert code with compiled select commands producing modified code having select code and the checking code thereby enabling constraint checking for each record in the table $T_i$;
- executing the modified code over the table $T_i$ to report at least one constraint violation and to identify all the records in the table $T_i$ that exhibit constraint violations in an error reporting data message; and
- constructing an insert command to place the error reporting message and any column entries of records exhibiting a constraint violation in the exception table $E_i$.

16. The method of claim 15, wherein the constructed insert command is executed, thereby causing the exception table $E_i$ to be populated with the column entries of records exhibiting a constraint violation, and an error reporting message for each record exhibiting a constraint violation.

17. The method of claim 16, and further comprising the steps of fixing the table $T_i$ to eliminate violating records by:
   (a) selecting a record in the table $T_i$ that is identified as exhibiting a constraint violation; and
   (b) deleting each record selected in step 16(a).

18. A bulk-data constraint checking system in a relational database management system (RDMS) having memory including mass storage for storing a database that has at least one table $T_i$ containing a plurality of data records, each data record being uniquely identifiable in the RDMS, wherein the RDMS system further has a data processor for processing queries represented by a query graph, the system comprising:

- insert query generating means coupled to said data processor for generating an insert query $Q_{MAIN}$ with one or more records to be inserted into the table $T_i$;
- a constraint compiler with a constraint engine for compiling the insert query $Q_{MAIN}$ to produce compiled insert commands including insert code and checking code to check for constraint violations in one or more records specified by the insert query $Q_{MAIN}$;
- query modifying means coupled with the data processor for modifying the query $Q_{MAIN}$ by replacing the insert code with compiled select commands to produce modified code having select code and the checking code; and,
- select and constraint checking command execution means coupled with the data processor for executing the modified code over the table $T_i$ to report at least one constraint violation in an error reporting data message.

19. The bulk-data constraint checking system of claim 18, wherein the modified code identifies and reports all the records in the table $T_i$ that exhibit constraint violations.

20. The bulk-data constraint checking system of claim 19, wherein the modified code reports a string for each record in the table $T_i$ exhibiting a constraint violation, the string containing concatenated constraint names, each constraint name of the concatenated constraint names corresponding to a constraint violation exhibited by the record.

21. The bulk-data constraint checking system of claim 20, wherein the RDMS further includes an exception table $E_i$ stored in memory, and the checking system further comprises:

- command generating means coupled to the data processor for constructing an insert command to place the record identifier for each record exhibiting a constraint violation in the exception table $E_i$, and also to place each corresponding string containing concatenated constraint names in the exception table $E_i$.

22. The bulk-data constraint checking system of claim 21, and further comprising means for fixing the table $T_i$ to eliminate violating records including:
   (a) selection means coupled to the data processor for selecting each record in the table $T_i$ as exhibiting a constraint violation; and
   (b) record deletion means coupled to the data processor for deleting any record selected by the selection means.

23. The bulk-data constraint checking system of claim 22, and further comprising means for creating a record insert command to enable inserting in the exception table $E_i$ a copy of any records deleted by the record deletion means.

24. A database processing system comprising:

- memory including a data store for storing at least one table $T_i$ containing a plurality of data records, each data record being uniquely identifiable in the system;
- a data processor coupled to said data store for processing queries represented by query graphs;
- insert query generating means coupled to said data processor for generating an insert query $Q_{MAIN}$ with one or more records to be inserted into the table $T_i$;
- a constraint compiler with a constraint engine for compiling the insert query $Q_{MAIN}$ to produce compiled insert commands including insert code and checking code generated by the compiler's constraint engine to check for constraint violations in the records of the insert query $Q_{MAIN}$;
- query modifying means coupled with the data processor for modifying the query $Q_{MAIN}$ by replacing the insert code with compiled select commands to produce modified code having select code and the checking code generated by the compiler's constraint engine; and,
- select and constraint checking command execution means coupled with the data processor for executing the modified code over the table $T_i$ to report at least one constraint violation in an error reporting data message.

25. The database processing system of claim 24, wherein the modified code identifies and reports all the records in the table $T_i$ that exhibit constraint violations.

26. The database processing system of claim 25, wherein the modified code reports a string for each record exhibiting a constraint violation, the string containing concatenated constraint names, each constraint name of the concatenated constraint names corresponding to a constraint violation exhibited by the record.

27. The database processing system of claim 26, further including:

- an exception table $E_i$ stored in memory; and
- command generating means coupled to the data processor for constructing an insert command to place the record identifier for each record exhibiting a constraint violation in the exception table $E_i$, and also to place each corresponding string containing concatenated constraint names in the exception table $E_i$.

28. The database processing system of claim 27, and further comprising fix-up means for fixing the table $T_i$ to eliminate violating records including:
   (a) selection means coupled to the data processor for selecting each record in the table $T_i$ identified as exhibiting a constraint violation; and
   (b) record deletion means coupled to the data processor for deleting any record selected by the selection means.

29. The database processing system of claim 28, and further comprising means for creating a record insert command to enable inserting a copy of any records deleted from the exception table $E_i$.

30. A computer program product, for use with a relational database processing system having a compiler with a constraint engine and memory including mass storage, and also having a database stored in the mass storage that has at least one table $T_i$ containing a plurality of data records, each data record being uniquely identifiable in the system, wherein the relational database processing system further has a data processor for processing queries represented by a query graph, a method for checking for constraint violations in a data record of the plurality of data records in the table $T_i$ by using the compiler constraint engine, the computer program product comprising:
   a recording medium;
   means, recorded on the recording medium, for directing the data processor to generate an insert query $Q_{MAIN}$ with one or more records to be inserted into the table $T_i$;
   means, recorded on the recording medium, for directing the compiler to compile the insert query $Q_{MAIN}$ to produce compiled insert commands including insert code and checking code to check for constraint violations in one or more records specified by the insert query $Q_{MAIN}$;
   means, recorded on the recording medium, for directing the data processor to modify the query $Q_{MAIN}$ by replacing the insert code with compiled select commands to produce modified code having checking code generated by the compiler's constraint engine; and,
   means, recorded on the recording medium, for directing the data processor to execute the modified code over the table $T_i$ to report at least one constraint violation in an error reporting data message.

31. The computer program product of claim 30, wherein the modified code identifies and reports all the records in the table $T_i$ that exhibit constraint violations.

32. The computer program product of claim 30, wherein the modified code reports a string for each record exhibiting a constraint violation, the string containing concatenated constraint names, each constraint name of the concatenated constraint names corresponding to a constraint violation exhibited by the record.

33. The computer program product of claim 31, wherein the system further includes an exception table $E_i$ in memory, and the computer program product further comprises:
   insert command generating means recorded on the recording medium for directing the data processor to construct an insert command to place the record identifier for each record exhibiting a constraint violation in the exception table $E_i$, and also to place each corresponding string containing concatenated constraint names in the exception table $E_i$.

34. The computer program product of claim 33, and further comprising means, recorded on the recording medium for fixing the table $T_i$ to eliminate violating records including:
   (a) selection means for directing the data processor to select each record in the table $T_i$ identified as exhibiting a constraint violation; and
   (b) record deletion means for directing the data processor to delete any record selected by the selection means.

35. The computer program product of claim 33, and further comprising means, recorded on the recording medium for deleting records from the exception table, and for directing the data processor to create a record insert command to enable inserting a copy of any records deleted from the exception table $E_i$.

* * * * *